(12) United States Patent
Hussain et al.

(10) Patent No.: US 12,281,710 B2
(45) Date of Patent: Apr. 22, 2025

(54) BUTTERFLY VALVE

(71) Applicant: ROLLS-ROYCE plc, London (GB)

(72) Inventors: Zahid M. Hussain, Derby (GB);
Robert C. Pearce, Derby (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 18/770,742

(22) Filed: Jul. 12, 2024

(65) Prior Publication Data
US 2025/0043869 A1 Feb. 6, 2025

(30) Foreign Application Priority Data
Jul. 31, 2023 (GB) ..................................... 2311720

(51) Int. Cl.
*F16K 1/22* (2006.01)
*F04D 27/02* (2006.01)

(52) U.S. Cl.
CPC .......... *F16K 1/222* (2013.01); *F04D 27/0215* (2013.01)

(58) Field of Classification Search
CPC ............................... F16K 1/222; F16K 1/2261
USPC ........................................................ 251/305
See application file for complete search history.

(56) References Cited

U.S. PATENT DOCUMENTS

| | | | |
|---|---|---|---|
| 2,271,390 A | 1/1942 | Dodson | |
| 3,176,704 A | 4/1965 | Palma | |
| 3,516,640 A * | 6/1970 | Bryer | F16K 1/222 251/305 |
| 3,945,398 A * | 3/1976 | Masheder | F16K 1/222 137/527.8 |
| 6,003,490 A | 12/1999 | Kihara et al. | |
| 2003/0034474 A1* | 2/2003 | Proctor | F16K 1/222 251/305 |
| 2020/0056552 A1* | 2/2020 | Clauson | F02D 9/1065 |

FOREIGN PATENT DOCUMENTS

| | | | | |
|---|---|---|---|---|
| FR | 2202245 A1 * | 5/1974 | ............... | F16K 1/34 |
| GB | 1533073 A | 11/1978 | | |
| JP | 60164073 A * | 2/1984 | ............. | F16K 1/222 |
| WO | WO-02068846 A1 * | 9/2002 | ............. | F16K 1/222 |
| WO | 2011128974 A1 | 10/2011 | | |

OTHER PUBLICATIONS

Great Britain search report dated Feb. 1, 2024, issued in GB Patent Application No. 2311720.3.
European search report dated Dec. 2, 2024, issued in EP Patent Application No. 24185621.0.

* cited by examiner

*Primary Examiner* — Jason H Duger

(57) ABSTRACT

A butterfly valve for a conduit defining a passage for a flow of a fluid therethrough in a flow direction. The butterfly valve includes a shaft rotatably mounted to the conduit and defining a longitudinal axis along its length. The butterfly valve includes a valve body coupled to the shaft, such that the valve body is rotatable along with the shaft about the longitudinal axis between a closed position and a fully open position. The valve body includes a first major surface, a second major surface opposite to the first major surface, a perimeter surface, a central plane, a first lobe, a second lobe, and a third lobe.

20 Claims, 20 Drawing Sheets

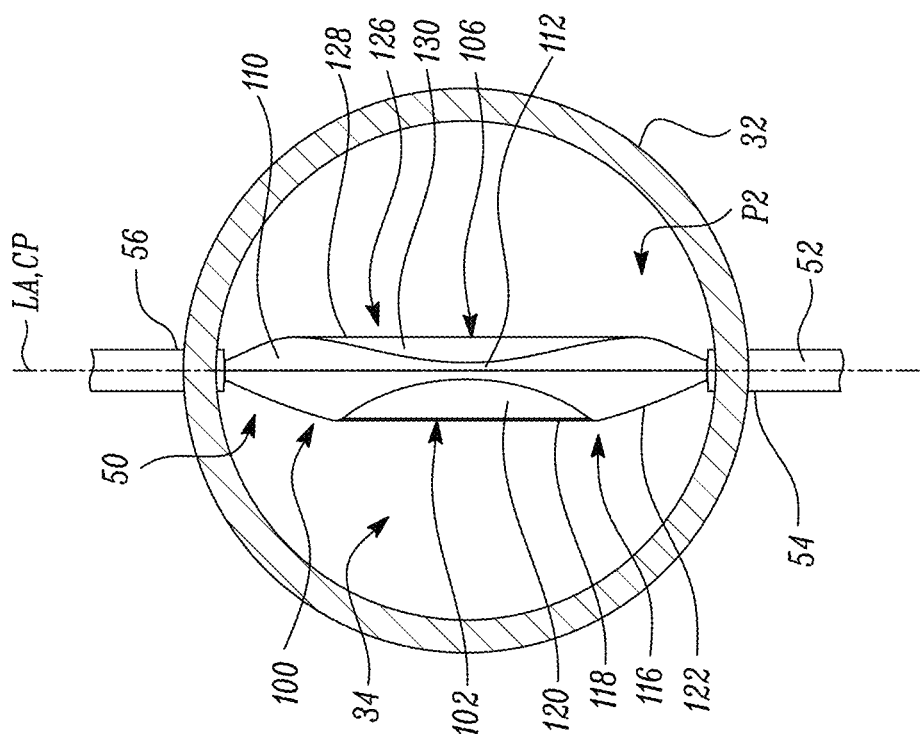
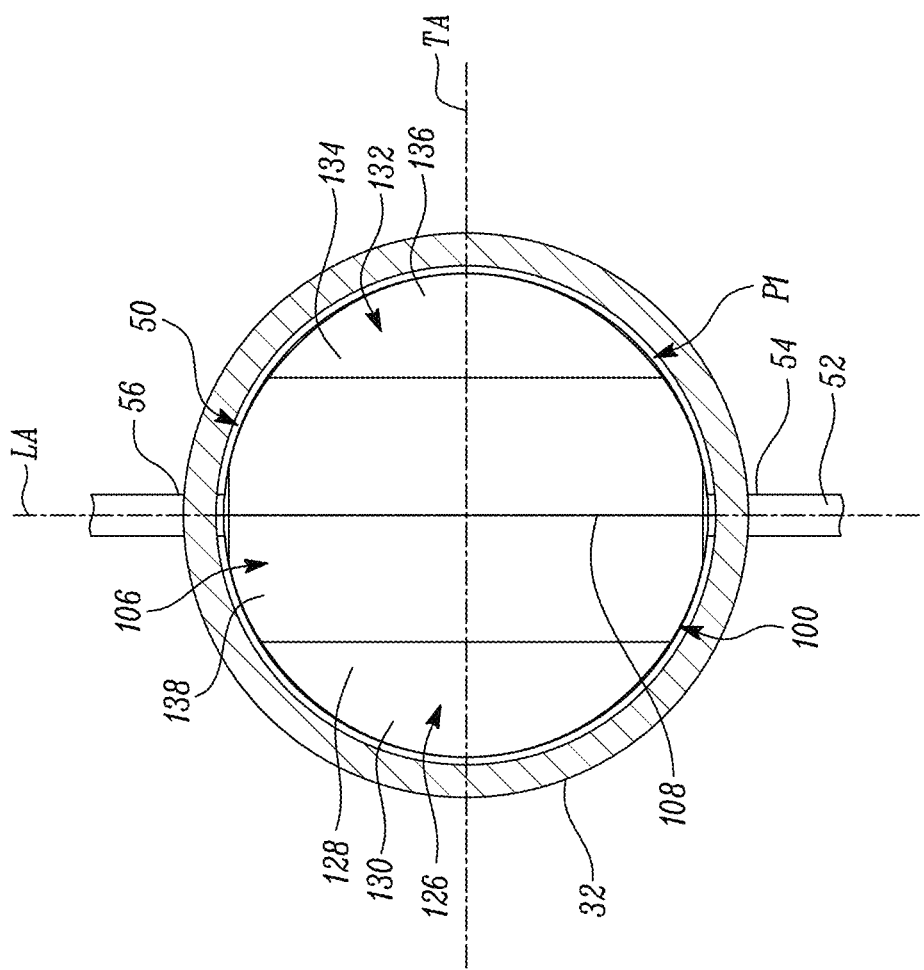
FIG. 2A
FIG. 2B

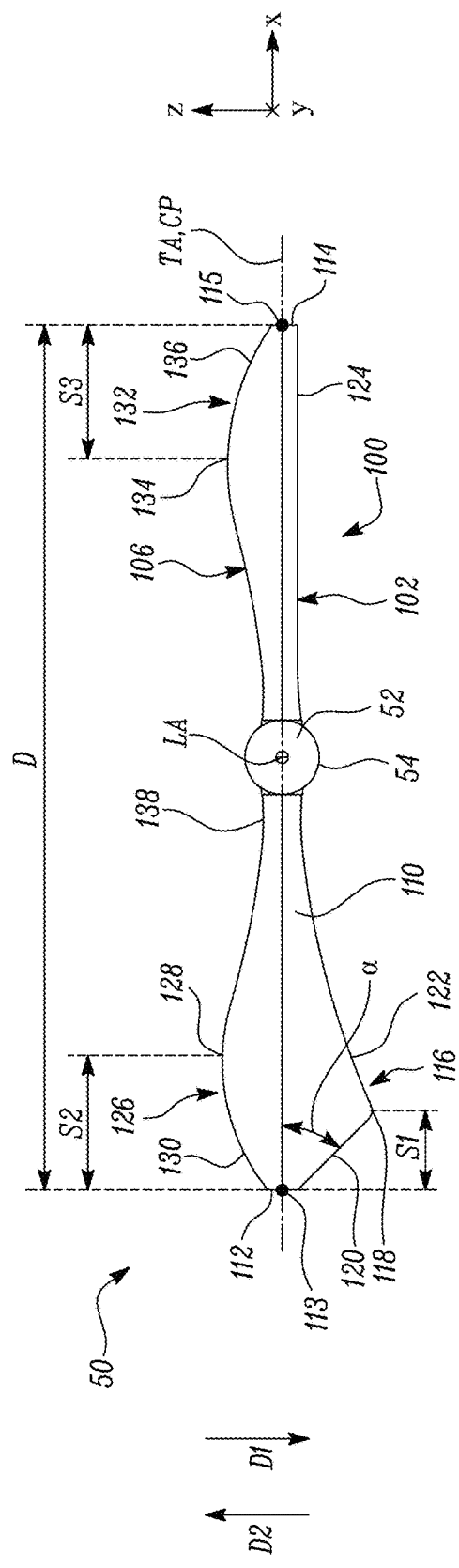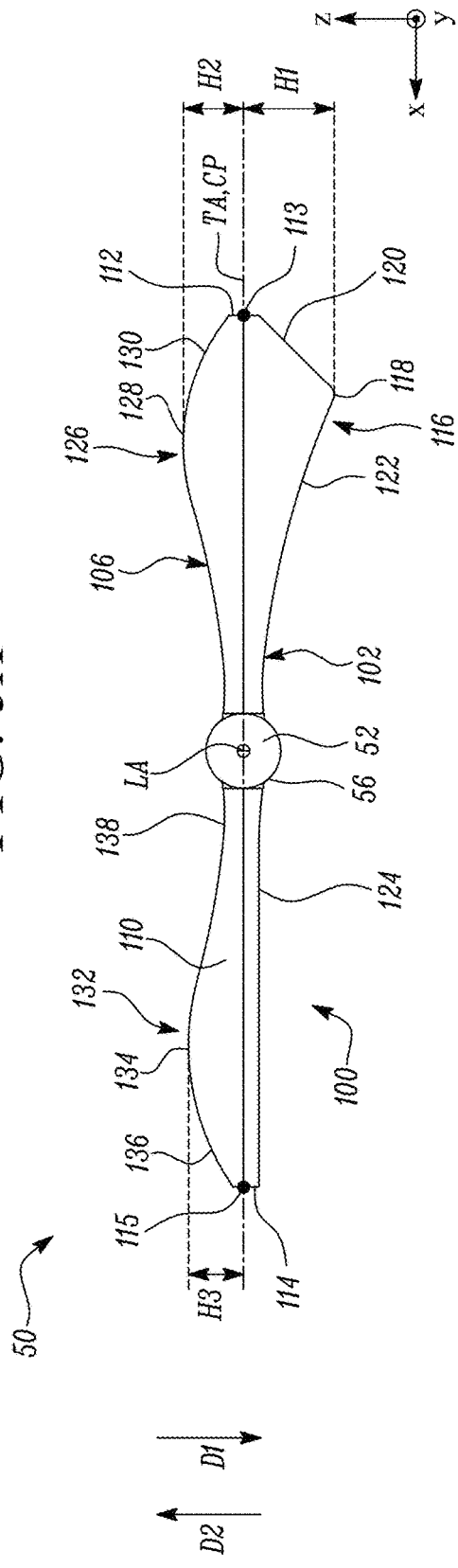
FIG. 5A
FIG. 5B

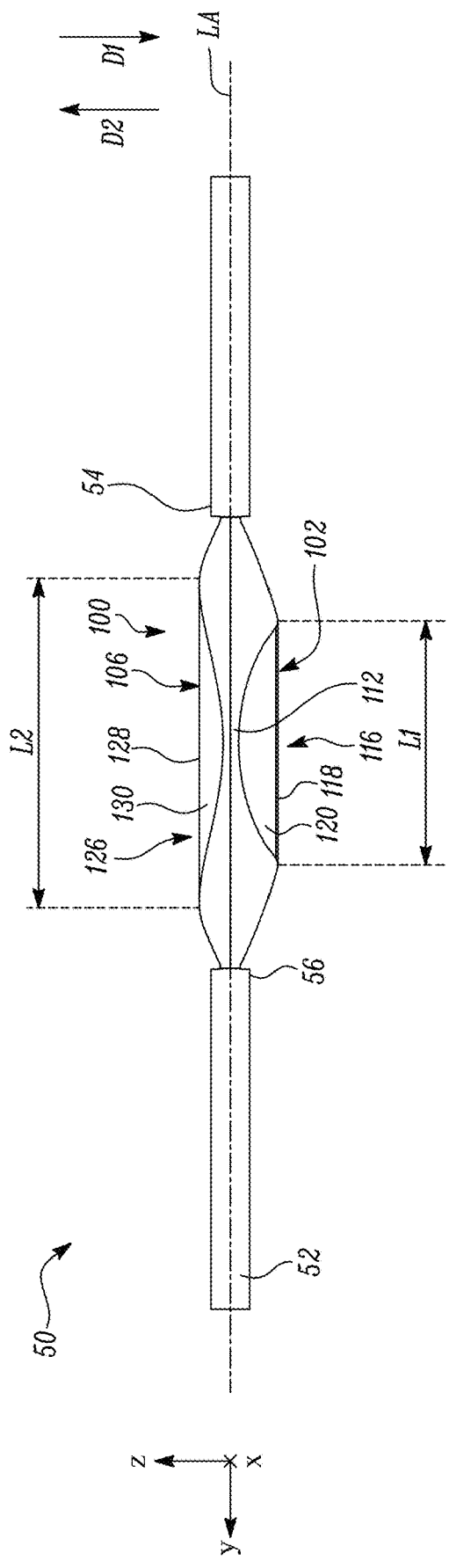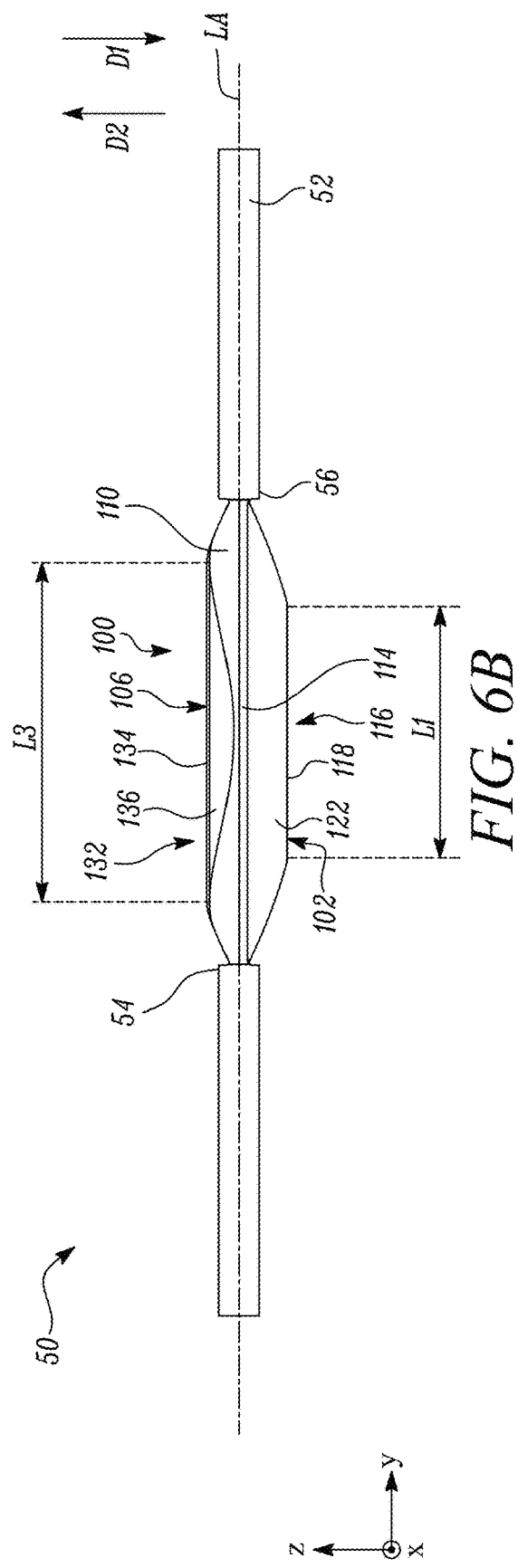

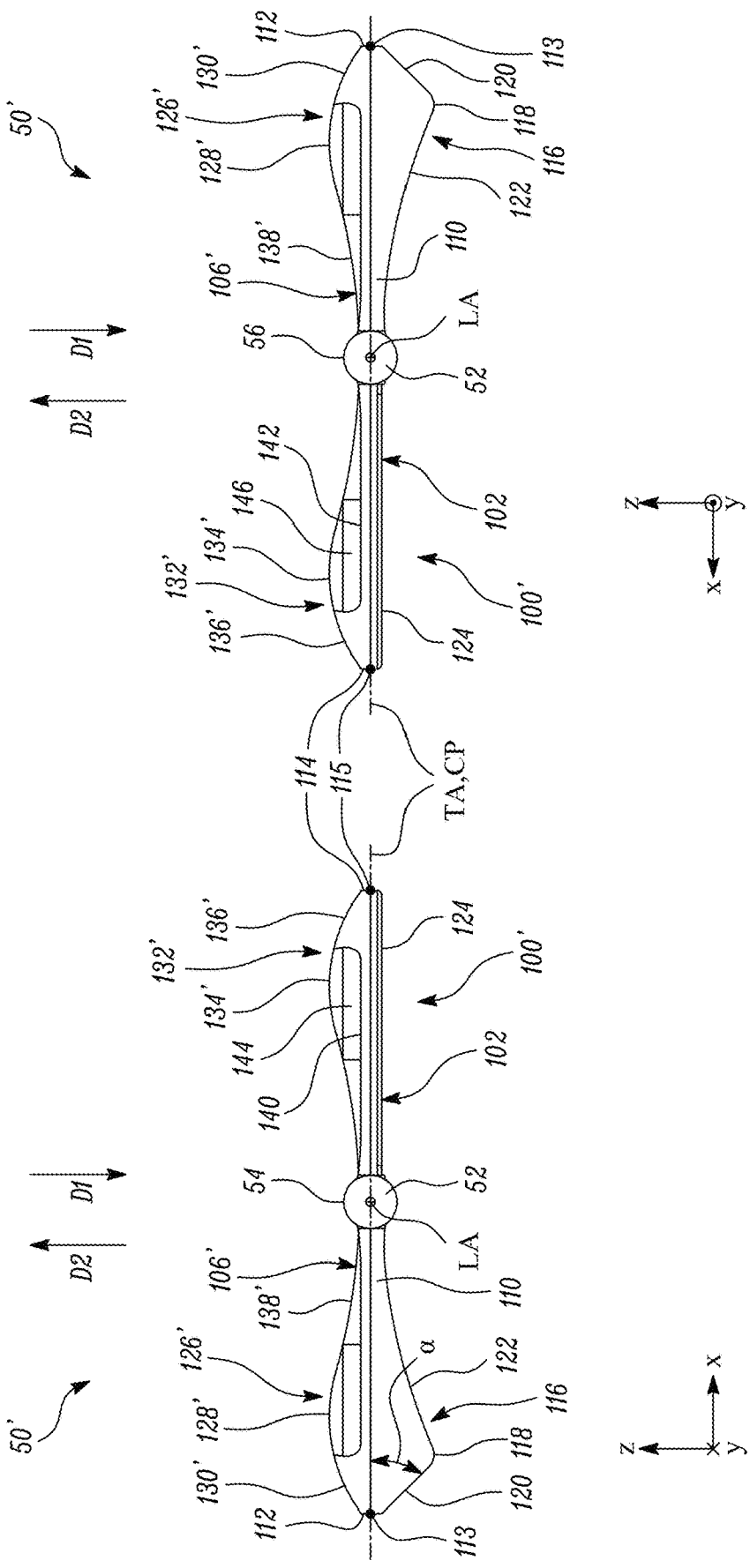

BUTTERFLY VALVE

CROSS-REFERENCE TO RELATED APPLICATIONS

This specification is based upon and claims the benefit of priority from United Kingdom patent application GB 2311720.3 filed on Jul. 31, 2023, the entire contents of which is incorporated herein by reference

BACKGROUND

Technical Field

The present disclosure generally relates to a butterfly valve and a method of manufacturing a butterfly valve.

Description of the Related Art

In gas turbines, one or more bleed valves are associated with a compressor (intermediate pressure compressor or low pressure compressor). Bleed air from the one or more bleed valves may be vented into a bypass duct of the gas turbine engine. The bleed valve may be opened when the gas turbine is operated at or close to idle.

For bleeding the compressor, bi-static valves are commonly used as bleed valves as they permit a level of stepped modulation for handling the compressor. However, the stepped modulation by the bi-static valves may not allow maximum thermal efficiency of the compressor at a non-dimensional speed. Operation of the bi-static valves may cause discrete changes in a working line (and operating point) of the compressor as the bi-static valves have only two operating states (i.e., fully open or fully closed). During use of the bi-static valves, a leak may also develop over time.

Another type of valve that is commonly used for bleeding the compressor is a sliding sleeve valve. The sliding sleeve valve is particularly helpful to control boosted stages of the compressor. The sliding sleeve valve provides ample area, but because a total movement of the sleeve is small, fine actuation control may be difficult. Thus, the sliding sleeve valve may be difficult to control as per application requirements.

Therefore, there is a need for an improved valve (i.e., a butterfly valve) for bleeding the compressor in the gas turbine. Conventional designs of the bleed valves may not provide optimal thermal efficiency of the compressor, especially during transient operation of the gas turbine. Moreover, control accuracy of the conventional designs of the bleed valves may be low. In some cases, due to higher torque loading, a size of valve actuator cannot be reduced and that in turn increases an overall cost of manufacturing the valves and the valve actuators.

SUMMARY

According to a first aspect there is provided a butterfly valve for a conduit defining a passage for a flow of a fluid therethrough in a flow direction. The butterfly valve includes a shaft rotatably mounted to the conduit and defining a longitudinal axis along its length, such that the shaft is rotatable about the longitudinal axis. The butterfly valve further includes a valve body coupled to the shaft, such that the valve body is rotatable along with the shaft about the longitudinal axis between a closed position and a fully open position. The valve body defines a transverse axis perpendicular to the longitudinal axis. In the closed position, the valve body engages the conduit to close the passage. In the fully open position, the valve body opens the passage to allow the flow of the fluid. The valve body includes a first major surface facing the flow of the fluid when the valve body is in the closed position. The first major surface includes a first central line extending along the length of the shaft parallel to the longitudinal axis. The valve body further includes a second major surface opposite to the first major surface. The second major surface includes a second central line extending along the length of the shaft parallel to the longitudinal axis. The valve body further includes a perimeter surface that is arcuate and extends between the first major surface and the second major surface. The perimeter surface is configured to engage with the conduit in the closed position of the valve body. The perimeter surface includes a leading portion that is spaced apart from each of the first central line and the second central line, and a trailing portion that is diametrically opposite to the leading portion. In the fully open position, the leading portion is a most upstream edge of the perimeter surface with respect to the flow direction and the trailing portion is a most downstream edge of the perimeter surface with respect to the flow direction. The transverse axis of the valve body extends between the leading portion and the trailing portion. The valve body further includes a central plane disposed between the first major surface and the second major surface. The central plane contains the longitudinal axis, a central point of the leading portion, and a central point of the trailing portion. The perimeter surface defines a diameter of the valve body in the central plane. The valve body further defines a first direction normal to the central plane and extending towards the first major surface. The valve body further defines a second direction opposite to the first direction.

The valve body further includes a first lobe partially forming the first major surface and extending at least partially from the leading portion towards the first central line along the transverse axis. The first lobe further extends at least partially along the longitudinal axis. The first lobe includes a first peak edge that is disposed proximal to the leading portion, such that the first lobe ascends from the leading portion to the first peak edge at least along the first direction and descends from the first peak edge towards the first central line. The valve body further includes a second lobe partially forming the second major surface and extending at least partially from the leading portion towards the second central line along the transverse axis. The second lobe further extends at least partially along the longitudinal axis. The second lobe includes a second peak edge that is disposed proximal to the leading portion, such that the second lobe ascends from the leading portion to the second peak edge at least along the second direction and descends from the second peak edge towards the second central line. The valve body further includes a third lobe spaced apart from each of the first lobe and the second lobe and partially forming the second major surface. The third lobe extends from the trailing portion towards the second central line along the transverse axis. The third lobe further extends at least partially along the longitudinal axis. The third lobe includes a third peak edge that is disposed proximal to the trailing portion, such that the third lobe ascends from the trailing portion to the third peak edge at least along the second direction and descends from the third peak edge towards the second central line. The first lobe and the second lobe are disposed on opposing sides of the central plane. The second lobe and the third lobe are disposed on the same side of the central plane. Each of the first peak edge, the second peak edge, and the third peak edge is rounded.

The inclusion of the first lobe, the second lobe, and the third lobe may cause reduced torque loading on the butterfly valve of the present disclosure as compared to that of conventional butterfly valves. The first lobe, the second lobe, and the third lobe may provide the butterfly valve with an optimized geometry that results in the reduced torque loading along with minimal flow capacity reduction across an operating range of the butterfly valve of the present disclosure. This may provide an improved performance of the butterfly valve when installed for bleeding purposes in an apparatus (e.g., a gas turbine engine). Further, the inclusion of the first lobe, the second lobe, and the third lobe does not restrict any movement of the butterfly valve of the present disclosure, thereby making it possible to be easily controlled by a valve actuator.

While the reduced torque loading is achieved with appropriate consideration for flow discharge requirements across the operating range of the butterfly valve, a size of the valve actuator may also be relatively reduced. Further, the inclusion of the first lobe, the second lobe, and the third lobe may lead to usage of less material for the manufacturing of the butterfly valve of the present disclosure as compared to the conventional butterfly valves. This may save a cost of manufacturing the butterfly valve of the present disclosure and the valve actuator.

In some embodiments, each of the first peak edge, the second peak edge, and the third peak edge extends parallel to the longitudinal axis. This extension of the first peak edge, the second peak edge, and the third peak edge parallel to the longitudinal axis may result in the optimized geometry of the butterfly valve.

In some embodiments, the first lobe further includes a planar surface ascending from the leading portion to the first peak edge and a concave surface descending from the first peak edge towards the first central line. Such shape and geometry of the first lobe may enhance the reduction of torque loading on the butterfly valve.

In some embodiments, the planar surface is inclined to the central plane by an inclination angle of from 40 degrees to 50 degrees. This range of the inclination angle of the planar surface with the central plane may provide the butterfly valve with the optimized geometry for torque reduction and maintaining the appropriate flow discharge across the butterfly valve.

In some embodiments, a first peak distance between the leading portion and the first peak edge is from 8% to 10% of the diameter of the valve body. This may result in the optimized geometry of the butterfly valve.

In some embodiments, a second peak distance between the leading portion and the second peak edge is equal to a third peak distance between the trailing portion and the third peak edge. Each of the second peak distance and the third peak distance is from 14% to 16% of the diameter of the valve body. This may improve flow performance, for example, a flow coefficient, of the fluid across the butterfly valve.

In some embodiments, a first peak height between the first peak edge and the central plane is from 9% to 11% of the diameter of the valve body. A second peak height between the second peak edge and the central plane is from 6% to 8% of the diameter of the valve body. A third peak height between the third peak edge and the central plane is from 5% to 7% of the diameter of the valve body. All such dimensions related to the first lobe, the second lobe, and the third lobe may provide the butterfly valve with the optimized geometry with corresponding benefits.

In some embodiments, a first peak length of the first peak edge parallel to the first central line is from 50% to 55% of the diameter of the valve body. This may result in the optimized geometry of the butterfly valve.

In some embodiments, a second peak length of the second peak edge parallel to the second central line is equal to a third peak length of the third peak edge parallel to the second central line. This may mitigate against flow separation in the conduit while the fluid passes therethrough in the fully open position of the valve body.

In some embodiments, the first peak edge is closer to the leading portion than the second peak edge with respect to the transverse axis. This may improve flow performance of the fluid across the butterfly valve.

In some embodiments, the second lobe includes a second convex surface extending from the corresponding leading portion towards the second central line along the transverse axis, such that the second convex surface includes the second peak edge. The third lobe includes a third convex surface extending from the corresponding trailing portion towards the second central line along the transverse axis, such that the third convex surface includes the third peak edge. The second convex surface and the third convex surface may facilitate flow continuity of the fluid across the second major surface of the butterfly valve.

In some embodiments, the first lobe is continuous with the perimeter surface. This may mitigate against flow separation in the vicinity of the first lobe.

In some embodiments, the first major surface includes a planar surface portion extending from the trailing portion to the first lobe and including the first central line. The planar surface portion is adjacent to the perimeter surface. This may result in the optimized geometry of the butterfly valve.

In some embodiments, the second major surface includes a central concave surface portion extending between the second lobe and the third lobe. The central concave surface portion includes the second central line. This may mitigate against flow separation in the conduit while the fluid passes therethrough in the fully open position of the valve body.

In some embodiments, the second major surface portion further includes a first planar surface portion extending from the perimeter surface at least along the longitudinal axis. The second major surface further includes a second planar surface portion disposed opposite to the first planar surface portion and extending from the perimeter surface at least along the longitudinal axis. The second major surface further includes a first intermediate surface portion rising from the first planar surface portion at least along the second direction to each of the second lobe, the third lobe, and the central concave surface portion. The first intermediate surface portion further extends at least partially along the transverse axis. The second major surface further includes a second intermediate surface portion disposed opposite to the first intermediate surface portion and rising from the second planar surface portion at least along the second direction to each of the second lobe, the third lobe, and the central concave surface portion. The second intermediate surface portion further extends at least partially along the transverse axis. Each of the second lobe, the third lobe, and the central concave surface portion is at least partially separated from the perimeter surface by the first planar surface portion and the second planar surface portion. The first planar surface portion, the second planar surface portion, the first intermediate surface portion, and the second intermediate surface portion may provide the butterfly valve with the optimized geometry for reduced torque loading as well as maximum flow discharge across the butterfly valve.

In some embodiments, each of the first intermediate surface portion and the second intermediate surface portion is at least partially concave. This may facilitate flow continuity of the fluid across the second major surface of the butterfly valve.

In some embodiments, the central concave surface portion is adjacent to the perimeter surface. This may result in the optimized geometry of the butterfly valve.

In some embodiments, each of the second lobe and the third lobe is at least partially spaced apart from the perimeter surface with respect to the longitudinal axis. This may provide the butterfly valve with the optimized geometry for a desirable amount of flow discharge across the butterfly valve.

In some embodiments, each of the second lobe and the third lobe is continuous with the perimeter surface. This may mitigate against flow separation in the conduit while the fluid passes therethrough in the fully open position of the valve body.

In some embodiments, the shaft includes a first shaft portion and a second shaft portion spaced apart from the first shaft portion with respect to the longitudinal axis. The first shaft portion and the second shaft portion are coupled to the valve body on opposing sides, such that each of the first central line and the second central line extends between the first shaft portion and the second shaft portion. The shaft may be driven by a drive mechanism or a valve actuator in order to open and close the butterfly valve within the conduit.

In some embodiments, the valve body is rotated by 90 degrees about the longitudinal axis relative to the closed position to open the passage. The valve body defines a valve angle that is equal to an angle of rotation of the valve body about the longitudinal axis relative to the closed position, such that the valve angle is equal to 0 degree at the closed position. The butterfly valve has a torque coefficient that is equal to a ratio of a torque applied on the butterfly valve to rotate the butterfly valve to a product of the cube of the diameter of the valve body and a pressure drop across the butterfly valve within the conduit. The butterfly valve and a comparative butterfly valve have the same construction and diameter except that first and second major surfaces of the comparative butterfly valve are planar without any lobes. For similar flow conditions within the conduit, the torque coefficient of each of the butterfly valve and the comparative butterfly valve varies with the valve angle and has a corresponding peak value. The peak value of the torque coefficient of the butterfly valve is less than the peak value of the torque coefficient of the comparative butterfly valve by at least 30%. As the peak value of the torque coefficient of the butterfly valve is less than the peak value of the torque coefficient of the comparative butterfly valve by at least 30%, it is evident that the butterfly valve of the present disclosure provides the optimized geometry for reduced torque loading as well as minimal flow capacity reduction across the operating range of the butterfly valve. This may improve an overall performance of the butterfly valve and the apparatus (for example, a gas turbine engine) in which the butterfly valve is installed.

In some embodiments, the first lobe, the second lobe, and the third lobe together reduce the peak value of the torque coefficient of the butterfly valve by at least 50% relative to the peak value of the torque coefficient of the comparative butterfly valve. Thus, the butterfly valve of the present disclosure is aerodynamically optimized for a desirable torque reduction relative to that of the comparative butterfly valve.

The butterfly valve has a flow coefficient that is equal to a ratio of a mass flow rate of the fluid flowing through the conduit to a product of an area of the butterfly valve in the central plane and a square root of twice a product of a density of the fluid and the pressure drop across the butterfly valve. The flow coefficient of each of the butterfly valve and the comparative butterfly valve varies with the valve angle. For similar flow conditions within the conduit and for any value of the valve angle, a maximum difference between the flow coefficient of the butterfly valve and the flow coefficient of the comparative butterfly valve is at most 10%. Specifically, the flow coefficient of the butterfly valve is less than the flow coefficient of the comparative butterfly valve by at most 10%. As the maximum difference between the flow coefficient of the butterfly valve of the present disclosure and the flow coefficient of the comparative butterfly valve is at most 10%, it is evident that there is minimal flow capacity reduction across the operating range of the butterfly valve of the present disclosure. Hence, considering the comparison of the peak value of the torque coefficient of the butterfly valve with the peak value of the torque coefficient of the comparative butterfly valve, and the comparison of the flow coefficient of the butterfly valve with the flow coefficient of the comparative butterfly valve, it can be stated that the butterfly valve of the present disclosure may provide a desirable torque loading as well as an achievable flow capacity across the operating range of the butterfly valve.

According to a second aspect there is provided a gas turbine. The gas turbine includes a compressor, a bleed conduit disposed in fluid communication with the compressor, and the butterfly valve of the first aspect. The butterfly valve is disposed in the bleed conduit. The optimized geometry of the butterfly valve of the present disclosure may result in improved thermal efficiency of the compressor in the gas turbine, relative to a compressor comprising at least one bi-static bleed valve. This is because as a bi-static bleed valve only has two operating states (for example, fully open or fully closed), operation of the at least one bi-static bleed valve causes discrete changes in a working line (and operating point) of the compressor. In contrast, the optimised geometry of the butterfly valve permits continuous modulation of the degree of bleed flow, leading to continuous variation in compressor working line, allowing selection of a compressor working line that corresponds to a higher compressor efficiency. In this way, an overall efficiency of the gas turbine may be increased.

According to a third aspect there is provided a method of manufacturing the butterfly valve of the first aspect. The method includes providing a base disc model having a diameter equal to the valve body of the butterfly valve. The base disc model includes a first base major surface, a second base major surface opposite to the first base major surface, and a base perimeter surface extending between the first base major surface and the second base major surface. Each of the first base major surface and the second base major surface is planar. The method further includes providing a plurality of surface splines on the base disc model to modify the first base major surface and the second base major surface in order obtain a plurality of parametrized baseline geometries corresponding to the plurality of surface splines. A surface spline can be understood as a mathematical representation for which it is easy to build an interface that will allow a user to design and control the shape of complex curves and surfaces. The method further includes performing, by a simulator software, simulation on the plurality of parametrized baseline geometries based on computational fluid dynamics (CFD) in order to obtain pressure and velocity distributions across various points on each of the plurality of parametrized baseline geometries. The method further includes exporting, by a solver, simulation data including a mass flow rate of the fluid across each of the plurality of parametrized baseline geometries and a torque applied on each of the plurality of parametrized baseline geometries to form export data. The method further includes selecting at least one parameterized base geometry from the plurality of parametrized baseline geometries based on the export data. The method further includes creating, by a solver, a surrogate Gaussian process regression model based on the export data and geometrical parameters of each of the at least one parametrized baseline geometry. A surrogate model may refer to a mathematical model that seeks to predict, such as by interpolating or extrapolating a response, or output, based on output values previously acquired from empirical observation and/or mathematical calculations, including calculations using an existing full-physics model. Such surrogate model is generated by using Gaussian process regression model.

The method further includes minimizing, by the surrogate Gaussian process regression model, an objective function in order to generate geometrical parameters of a butterfly valve model corresponding to the butterfly valve. The method further includes verifying, by the simulator software, the geometrical parameters of the butterfly valve based on the mass flow rate across the butterfly valve model and the torque applied on butterfly valve model. The method further includes manufacturing the butterfly valve based on the butterfly valve model.

The surrogate Gaussian process regression model may improve an efficiency of the manufacturing process of the butterfly valve of the present disclosure. The surrogate Gaussian process regression model may allow a reduction in the overall computation load, thereby increasing the efficiency of the manufacturing process of the butterfly valve.

The method of the third aspect uses different sequential steps to achieve the final and optimized geometry of the butterfly valve disclosed in the first aspect. The steps of the method can be varied based on different application attributes.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

DESCRIPTION OF THE DRAWINGS

Embodiments will now be described by way of example only, with reference to the Figures, in which:

FIG. 2A is a sectional front view of a conduit associated with a compressor of the gas turbine engine of FIG. 1 and a butterfly valve disposed in the conduit in a closed position;

FIG. 2B is another sectional front view of the conduit of FIG. 2A with the butterfly valve in a fully open position;

FIG. 5A is a side view of the butterfly valve of FIG. 3A, as viewed from a first side;

FIG. 5B is a side view of the butterfly valve of FIG. 3A, as viewed from a second side opposite to the first side;

FIG. 6A is a front view of the butterfly valve of FIG. 3A;

FIG. 6B is a rear view of the butterfly valve of FIG. 3A;

FIG. 10A is a side view of the butterfly valve of FIG. 8, as viewed from a first side;

FIG. 10B is a rear view of the butterfly valve of FIG. 8, as viewed from a second side opposite to the first side;

DETAILED DESCRIPTION

Aspects and embodiments of the present disclosure will now be discussed with reference to the accompanying figures. Further aspects and embodiments will be apparent to those skilled in the art.

Figure 1:
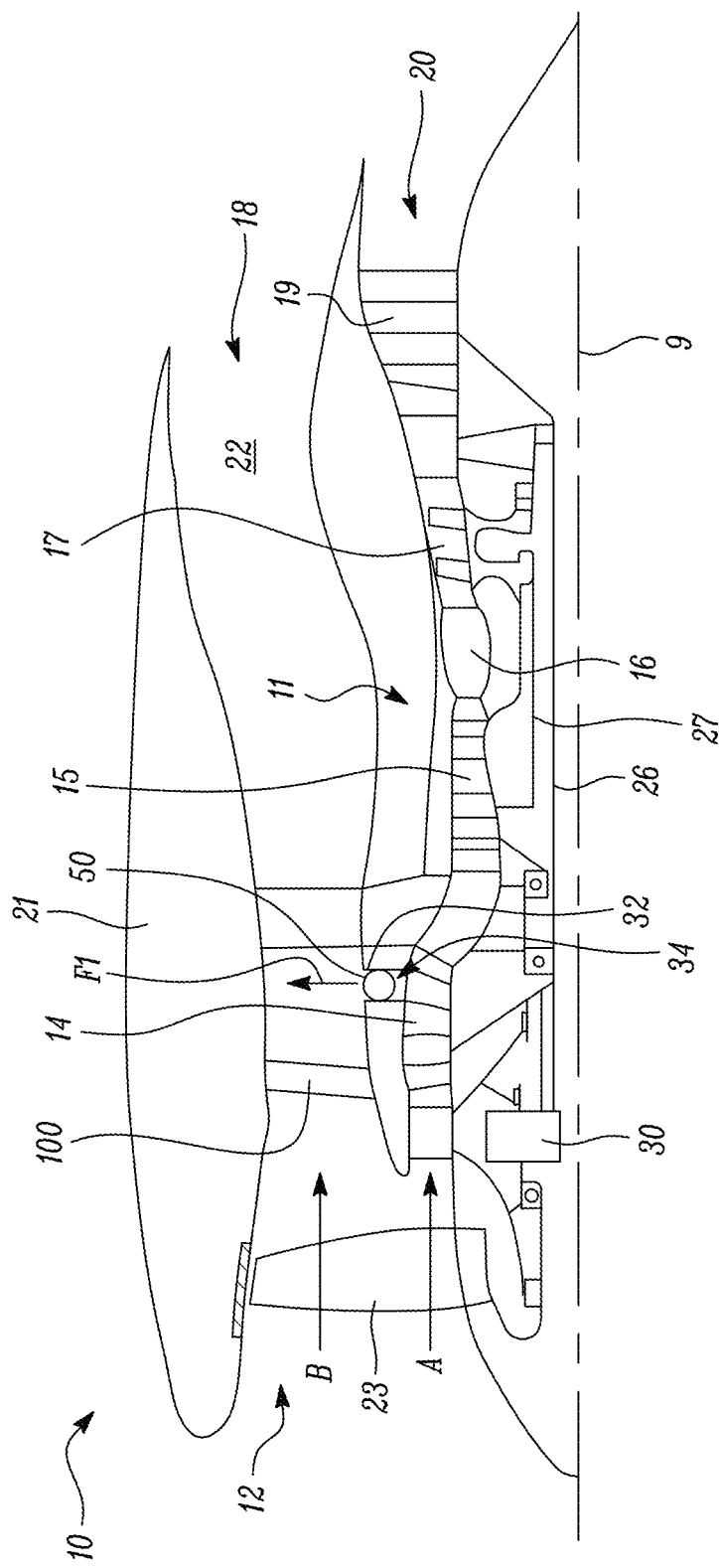
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high pressure compressor 15, combustion equipment 16, a high pressure turbine 17, a low pressure turbine 19, and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the core exhaust nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine 19" and "low pressure compressor 14" referred to herein may alternatively be known as the "intermediate pressure turbine 19" and "intermediate pressure compressor 14", respectively. Where such alternative nomenclature is used, the fan 23 may be referred to as a first, or lowest pressure, compression stage. The low pressure compressor 14 may be interchangeably referred to herein as the "intermediate pressure compressor 14".

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core exhaust nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

The gas turbine engine 10 further includes a bleed conduit 32 disposed in fluid communication with the compressor (e.g., the intermediate pressure compressor 14). The bleed conduit 32 allows selective removal of air downstream of the intermediate pressure compressor 14, thereby allowing a reduction of pressure ratio across the intermediate pressure compressor 14. In the illustrated embodiment of FIG. 1, the bleed conduit 32 exits the air into the bypass duct 22. The bleed conduit 32 can be interchangeably referred to herein as "a conduit 32". The conduit 32 defines a passage 34 for a flow of a fluid therethrough in a flow direction F1. In the gas turbine engine 10, the fluid is air. In some other examples, the fluid may be some other gas, or a liquid. The gas turbine engine 10 further includes a butterfly valve 50 for the conduit 32. The butterfly valve 50 is disposed in the bleed conduit 32. The butterfly valve 50 is configured to handle and control the air flow (bleed flow) through the bleed conduit 32.

Figure 2C:
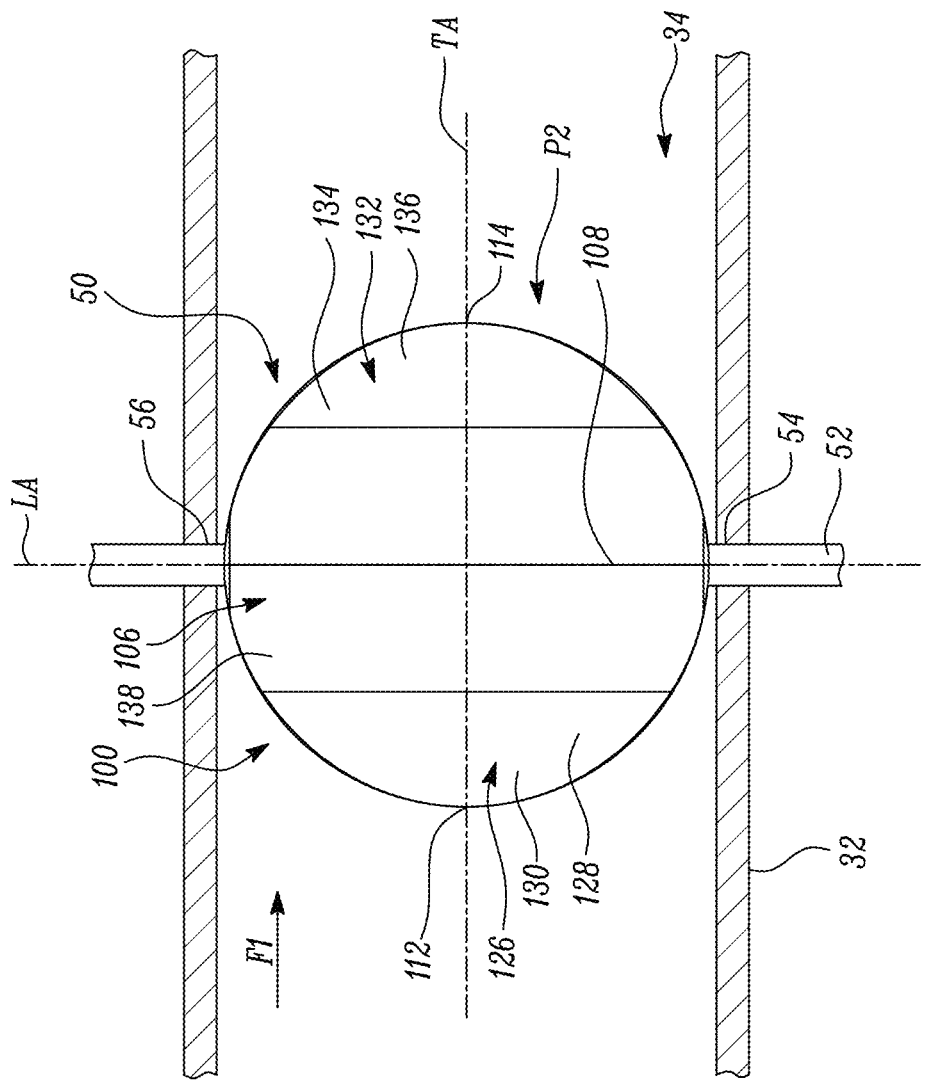
FIG. 2C is a sectional side view of the conduit with the butterfly valve in the fully open position of FIG. 2B.

FIGS. 2A and 2B are sectional front views of the conduit 32 associated with the intermediate compressor 14 of the gas turbine engine 10 of FIG. 1 with the butterfly valve 50 disposed in the conduit 32 in different positions, according to an embodiment of the present disclosure. FIG. 2C is a sectional side view of the conduit 32 with the butterfly valve 50 in the position of FIG. 2B, according to an embodiment of the present disclosure. Referring to FIGS. 2A to 2C, the butterfly valve 50 includes a shaft 52 rotatably mounted to the conduit 32. The shaft 52 defines a longitudinal axis LA along its length, such that the shaft 52 is rotatable about the longitudinal axis LA. The butterfly valve 50 further includes a valve body 100 coupled to the shaft 52, such that the valve body 100 is rotatable along with the shaft 52 about the longitudinal axis LA between a closed position P1 and a fully open position P2. In the illustrated embodiment of FIG. 2A, the valve body 100 is shown in the closed position P1. In the illustrated embodiment of FIG. 2B, the valve body 100 is shown in the fully open position P2. The valve body 100 is also shown in the fully open position P2 in FIG. 2C.

In some embodiments, the shaft 52 includes a first shaft portion 54 and a second shaft portion 56 spaced apart from the first shaft portion 54 with respect to the longitudinal axis LA. The first shaft portion 54 and the second shaft portion 56 are coupled to the valve body 100 on opposing sides. The valve body 100 defines a transverse axis TA perpendicular to the longitudinal axis LA. In the closed position P1 the valve body 100 engages the conduit 32 to close the passage 34. In the fully open position P2, the valve body 100 opens the passage 34 to allow the flow of the fluid.

The valve body 100 is rotated by 90 degrees about the longitudinal axis LA relative to the closed position P1 to open the passage 34. A valve actuator (not shown) rotates the valve body 100 along with the shaft 52 based on flow requirements. The valve actuator may be a motor drive. The valve body 100 defines a valve angle β (illustrated in FIG. 7A) that is equal to an angle of rotation of the valve body 100 about the longitudinal axis LA relative to the closed position P1, such that the valve angle β is equal to 0 degree at the closed position P1. The valve angle β is equal to 90 degrees at the fully open position P2.

Figure 3A:
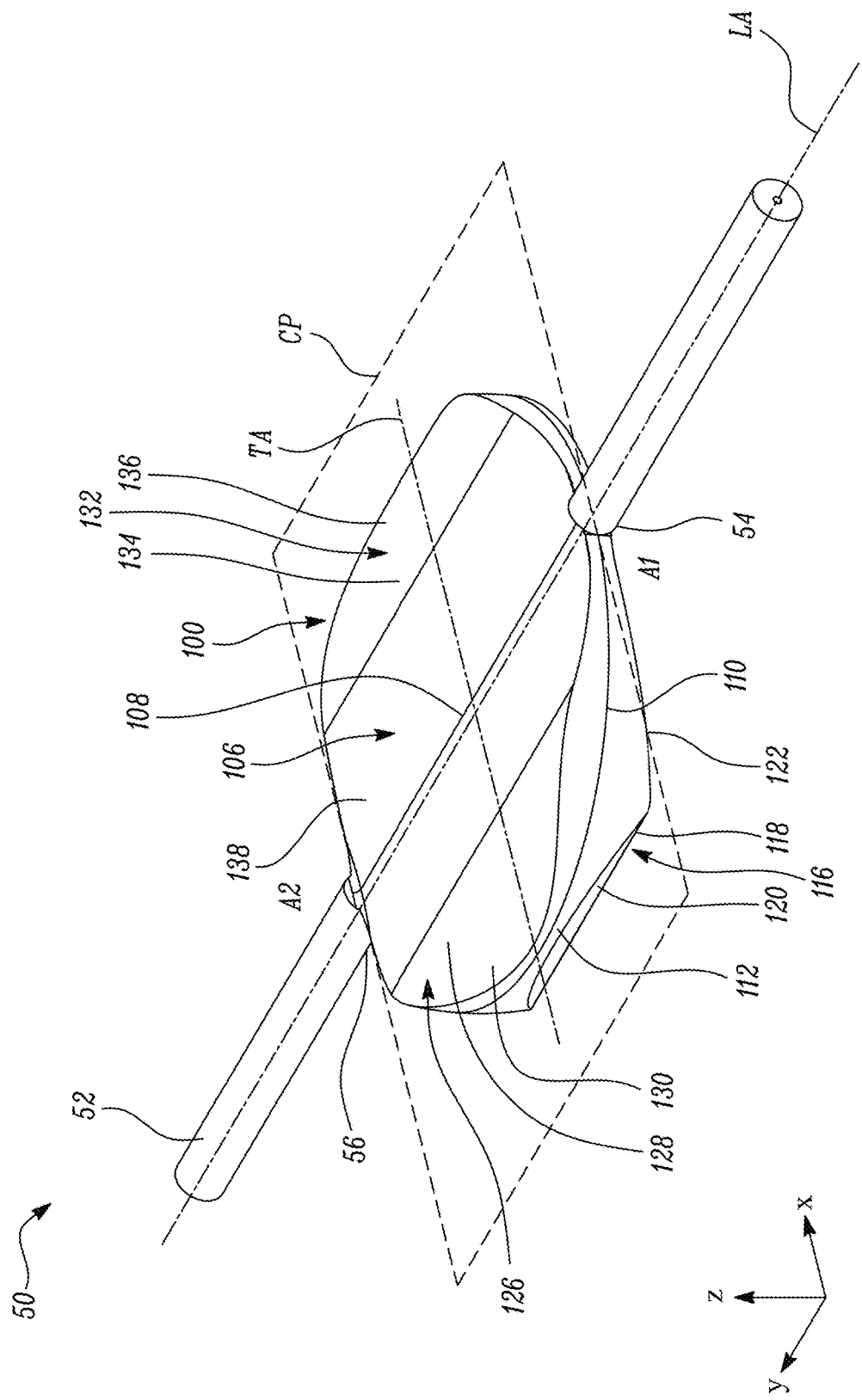
FIG. 3A is a perspective top view of the butterfly valve of FIG. 2A.

FIG. 3A is a perspective top view of the butterfly valve 50 of FIG. 2A, according to an embodiment of the present disclosure. The butterfly valve 50 defines mutually orthogonal x, y, and z-axes. The x and y-axes are in-plane axes of the butterfly valve 50, while the z-axis is disposed along a thickness of the butterfly valve 50. In other words, x and y-axes are along a plane of the butterfly valve 50 defining a xy-plane, and the z-axis is perpendicular to the xy-plane of the butterfly valve 50. The longitudinal axis LA extends along the y-axis. The transverse axis TA extends along the x-axis.

Figure 3B:
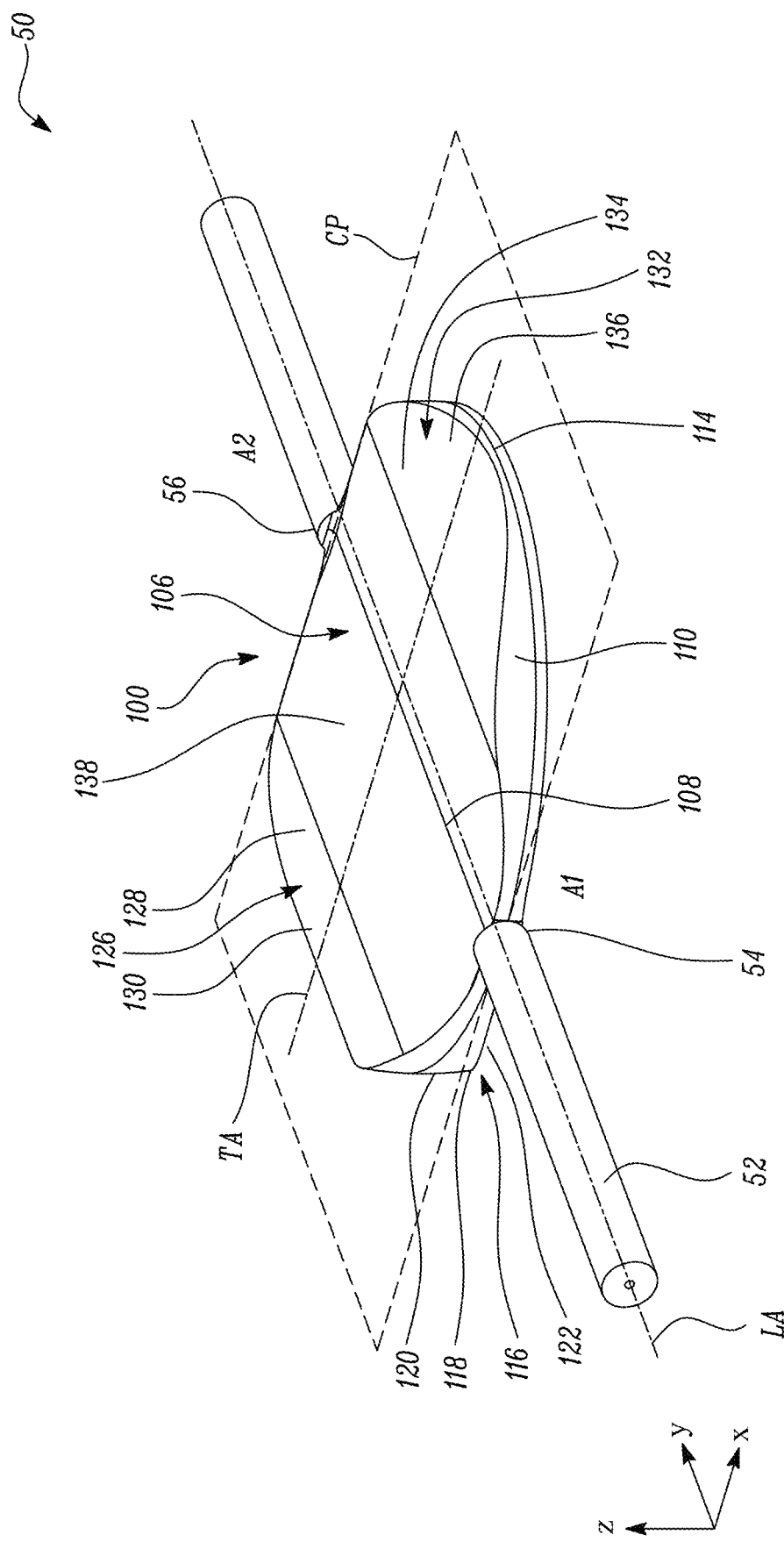
FIG. 3B is another perspective top view of the butterfly valve of FIG. 3A.
Figure 3C:
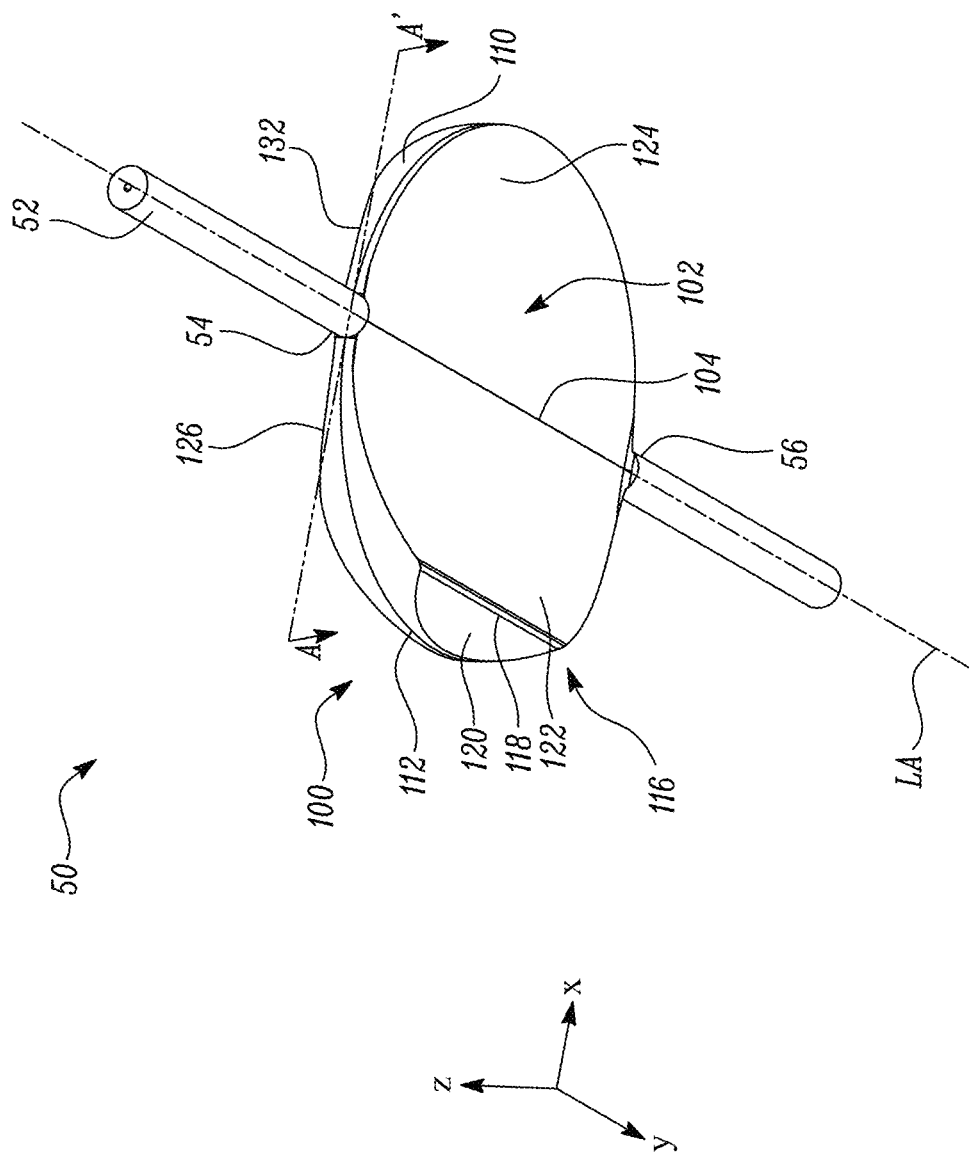
FIG. 3C is a perspective bottom view of the butterfly valve of FIG. 3A.
Figure 3D:
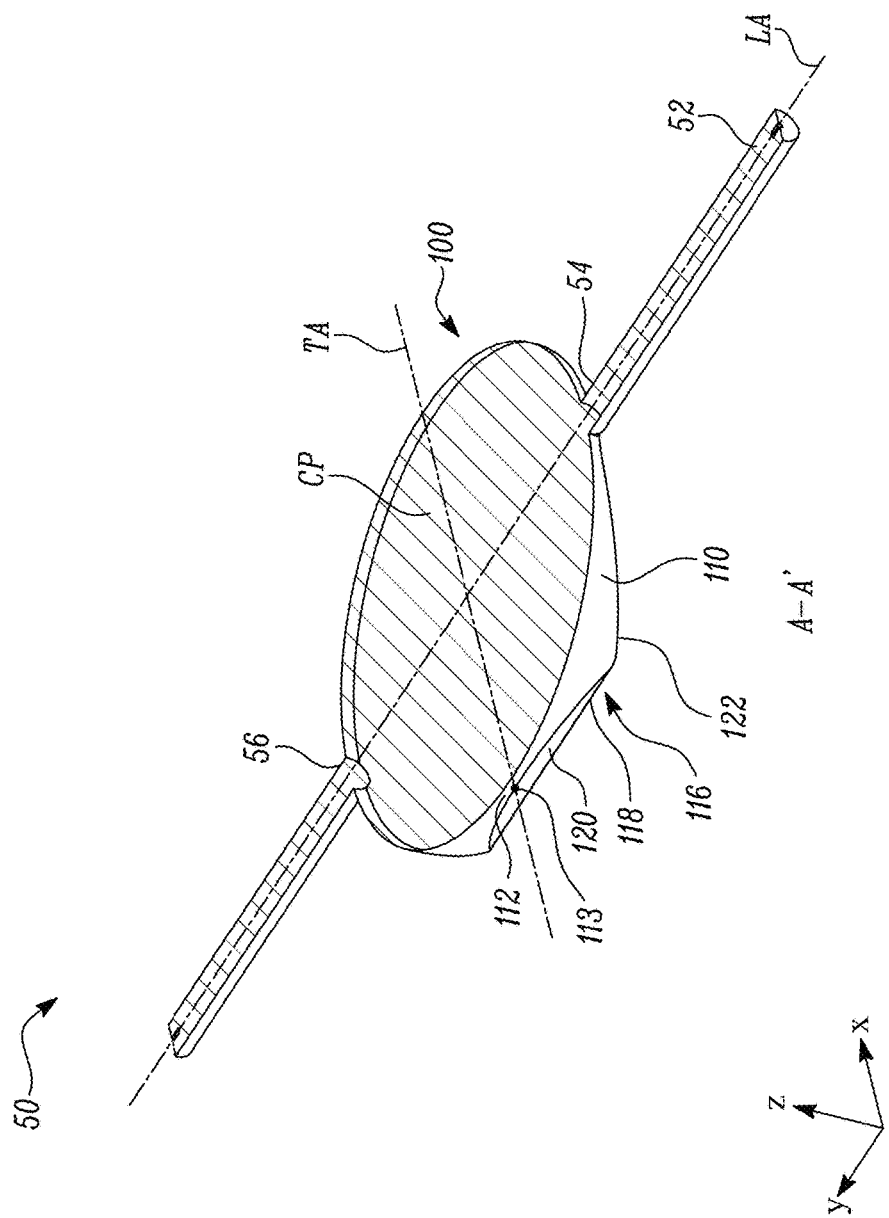
FIG. 3D is a perspective sectional view of the butterfly valve of FIG. 3C, taken along a line A-A'.
Figure 4B:
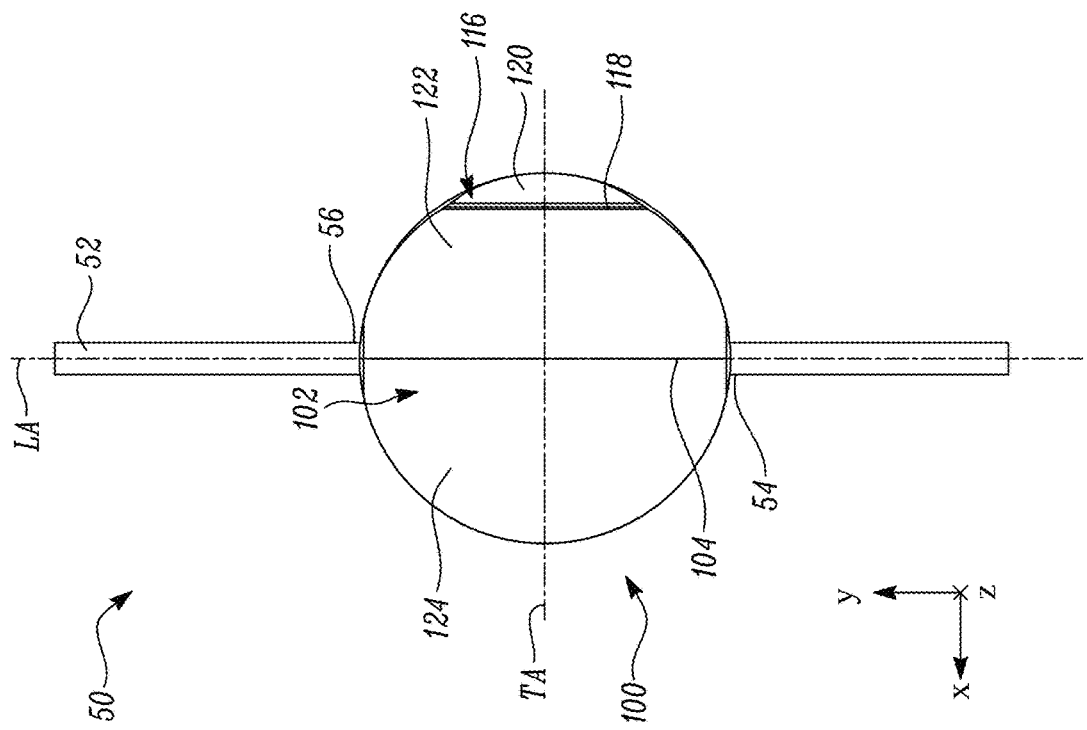
FIG. 4B is a bottom view of the butterfly valve of FIG. 3A.
Figure 4A:
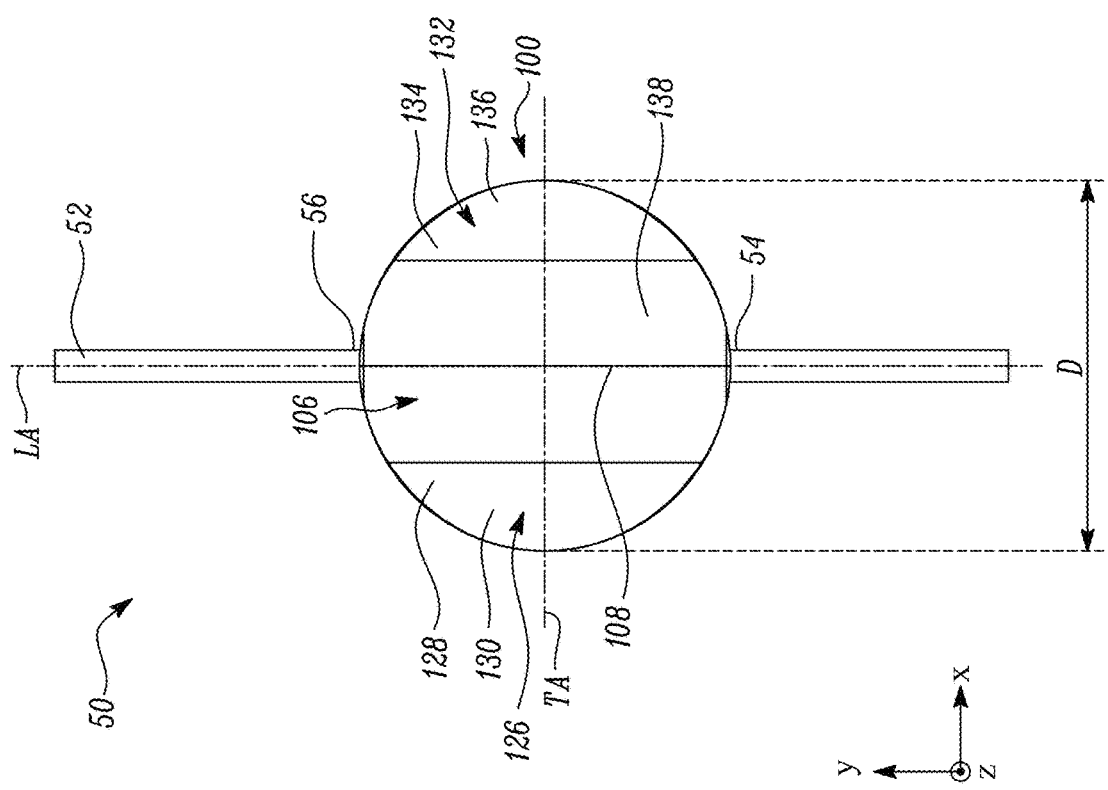
FIG. 4A is a top view of the butterfly valve of FIG. 3A.

FIG. 3B is another perspective top view of the butterfly valve 50, according to an embodiment of the present disclosure. FIG. 3C is a perspective bottom view of the butterfly valve 50, according to an embodiment of the present disclosure. FIG. 3D is a perspective sectional view of the butterfly valve 50 of FIG. 3C, taken along a line A-A', according to an embodiment of the present disclosure. FIG. 4A is a top view of the butterfly valve 50, according to an embodiment of the present disclosure. FIG. 4B is a bottom view of the butterfly valve 50, according to an embodiment of the present disclosure. FIG. 5A is a side view of the butterfly valve 50, as viewed from a first side A1, according to an embodiment of the present disclosure. FIG. 5B is a side view of the butterfly valve 50, as viewed from a second side A2 opposite to the first side A1, according to an embodiment of the present disclosure. FIG. 6A is a front view of the butterfly valve 50 of FIG. 3A, according to an embodiment of the present disclosure. FIG. 6B is a rear view of the butterfly valve 50 of FIG. 3A, according to an embodiment of the present disclosure.

Referring to FIGS. 3A to 6B, the valve body 100 includes a first major surface 102 (shown in FIGS. 3C and 4B) facing the flow of the fluid when the valve body 100 is in the closed position P1 (shown in FIG. 2A). The first major surface 102 includes a first central line 104 extending along the length of the shaft 52 parallel to the longitudinal axis LA. The valve body 100 further includes a second major surface 106 opposite to the first major surface 102. The second major surface 106 includes a second central line 108 extending along the length of the shaft 52 parallel to the longitudinal axis LA. Therefore, the first central line 104 is parallel to the second central line 108. Each of the first central line 104 and the second central line 108 extends between the first shaft portion 54 and the second shaft portion 56.

The valve body 100 further includes a perimeter surface 110 that is arcuate and extends between the first major surface 102 and the second major surface 106. The perimeter surface 110 is configured to engage with the conduit 32 (shown in FIG. 2A) in the closed position P1 of the valve body 100. The perimeter surface 110 includes a leading portion 112 that is spaced apart from each of the first central line 104 and the second central line 108. The perimeter surface 110 further includes a trailing portion 114 that is diametrically opposite to the leading portion 112. In the fully open position P2 (shown in FIGS. 2B and 2C), the leading portion 112 is a most upstream edge of the perimeter surface 110 with respect to the flow direction F1 and the trailing portion 114 is a most downstream edge of the perimeter surface 110 with respect to the flow direction F1. The transverse axis TA of the valve body 100 extends between the leading portion 112 and the trailing portion 114.

The valve body 100 further includes a central plane CP (best shown in FIG. 3D) disposed between the first major surface 102 and the second major surface 106. The central plane CP contains the longitudinal axis LA, a central point 113 (shown in FIGS. 5A and 5B) of the leading portion 112, and a central point 115 (shown in FIGS. 5A and 5B) of the trailing portion 114. The central plane CP lies in the xy-plane.

The perimeter surface 110 defines a diameter D (shown in FIGS. 4A and 5A) of the valve body 100 in the central plane CP. The valve body 100 further defines a first direction D1 normal to the central plane CP and extending towards the first major surface 102. The valve body 100 further defines a second direction D2 opposite to the first direction D2. Each of the first direction D1 and the second direction D2 extends along the z-axis.

The valve body 100 further includes a first lobe 116 partially forming the first major surface 102. The first lobe 116 extends at least partially from the leading portion 112 towards the first central line 104 along the transverse axis TA. The first lobe 116 further extends at least partially along the longitudinal axis LA.

The first lobe 116 includes a first peak edge 118 that is disposed proximal to the leading portion 112. The first lobe 116 ascends from the leading portion 112 to the first peak edge 118 at least along the first direction D1 and descends from the first peak edge 118 towards the first central line 104. The first lobe 116 further includes a planar surface 120 ascending from the leading portion 112 to the first peak edge 118. The first lobe 116 further includes a concave surface 122 descending from the first peak edge 118 towards the first central line 104.

In some embodiments, the planar surface 120 is inclined to the central plane CP by an inclination angle α (shown in FIG. 5A) of from 40 degrees to 50 degrees. In some embodiments, the inclination angle α is 45 degrees. In some embodiments, a first peak distance S1 (shown in FIG. 5A) between the leading portion 112 and the first peak edge 118 is from 8% to 10% of the diameter D of the valve body 100. In some embodiments, the first peak distance S1 is 9% of the diameter D of the valve body 100. In some embodiments, the first peak distance S1 may be from 5% to 15% of the diameter D of the valve body 100.

In some embodiments, a first peak height H1 (shown in FIG. 5B) between the first peak edge 118 and the central plane CP is from 9% to 11% of the diameter D of the valve body 100. In some embodiments, the first peak height H1 is 10% of the diameter D of the valve body 100. In some embodiments, the first peak height H1 may be from 4.5% to 16.5% of the diameter D of the valve body 100. In some embodiments, a first peak length L1 (shown in FIGS. 6A and 6B) of the first peak edge 118 parallel to the first central line 104 is from 50% to 55% of the diameter D of the valve body 100. In some embodiments, the first peak length L1 is 52.5% of the diameter D of the valve body 100. In some embodiments, the first peak length L1 may be from 36% to 66% of the diameter D of the valve body 100.

The first major surface 102 further includes a planar surface portion 124 (shown in FIGS. 5A and 5B) extending from the trailing portion 114 to the first lobe 116. The planar surface portion 124 may include the first central line 104. The planar surface portion 124 is adjacent to the perimeter surface 110. Further, in the illustrated embodiment of FIGS. 3A to 6B, the first lobe 116 is continuous with the perimeter surface 110.

The valve body 100 further includes a second lobe 126 partially forming the second major surface 106 of the valve body 100. The second lobe 126 extends at least partially from the leading portion 112 towards the second central line 108 along the transverse axis TA. The second lobe 126 further extends at least partially along the longitudinal axis LA. The first lobe 116 and the second lobe 126 are disposed on opposing sides of the central plane CP.

The second lobe 126 includes a second peak edge 128 that is disposed proximal to the leading portion 112. The second lobe 126 ascends from the leading portion 112 to the second peak edge 128 at least along the second direction D2 and descends from the second peak edge 128 towards the second central line 108. In some embodiments, a second peak height H2 (shown in FIG. 5B) between the second peak edge 128 and the central plane CP is from 6% to 8% of the diameter D of the valve body 100. In some embodiments, the second peak height H2 is 7% of the diameter D of the valve body 100. In some embodiments, the second peak height H2 may be from 4.5% to 11% of the diameter D of the valve body 100. In some embodiments, the first peak edge 118 is closer to the leading portion 112 than the second peak edge 128 with respect to the transverse axis TA.

The second lobe 126 further includes a second convex surface 130 extending from the corresponding leading portion 112 towards the second central line 108 along the transverse axis TA, such that the second convex surface 130 includes the second peak edge 128.

The valve body 100 further includes a third lobe 132 spaced apart from each of the first lobe 116 and the second lobe 126. The third lobe 132 partially forms the second major surface 106 of the valve body 100. The third lobe extends from the trailing portion 114 towards the second central line 108 along the transverse axis TA. The third lobe 132 further extends at least partially along the longitudinal axis LA. The second lobe 126 and the third lobe 132 are disposed on the same side of the central plane CP. Further, in the illustrated embodiment of FIGS. 3A to 6B, each of the second lobe 126 and the third lobe 132 is continuous with the perimeter surface 110.

The third lobe 132 includes a third peak edge 134 that is disposed proximal to the trailing portion 114. The third lobe 132 ascends from the trailing portion 114 to the third peak edge 134 at least along the second direction D2 and descends from the third peak edge 134 towards the second central line 108. Each of the first peak edge 118, the second peak edge 128, and the third peak edge 134 is rounded. In some embodiments, each of the first peak edge 118, the second peak edge 128, and the third peak edge 134 extends parallel to the longitudinal axis LA.

In some embodiment, a third peak height H3 (shown in FIG. 5B) between the third peak edge 134 and the central plane CP is from 5% to 7% of the diameter D of the valve body 100. In some embodiments, the third peak height H3 is 6% of the diameter D of the valve body 100. In some embodiments, the peak third height H3 may be from 1.8% to 11% of the diameter D of the valve body 100. In some embodiments, a second peak distance S2 between the leading portion 112 and the second peak edge 128 is equal to a third peak distance S3 (shown in FIG. 5A) between the trailing portion 114 and the third peak edge 134. In some embodiments, each of the second peak distance S2 and the third peak distance S3 is from 14% to 16% of the diameter D of the valve body 100. In some embodiments, each of the second peak distance S2 and the third peak distance S3 is 15% of the diameter D of the valve body 100. In some embodiments, each of the second peak distance S2 and the third peak distance S3 may be from 9% to 22% of the diameter D of the valve body 100.

In some embodiments, a second peak length L2 (shown in FIG. 6A) of the second peak edge 128 parallel to the second central line 108 is equal to a third peak length L3 (shown in FIG. 6B) of the third peak edge 134 parallel to the second central line 108. Each of the second peak length L2 and the third peak length L3 is from 40% to 70% of the diameter D of the valve body 100. In some embodiments, each of the second peak length L2 and the third peak length L3 is about 55% of the diameter D of the valve body 100. In some embodiments, each of the second peak length L2 and the third peak length L3 is from 27% to 88% of the diameter D of the valve body 100.

In some embodiments, the first peak distance S1 is from 15% to 20% of the first peak length L1. In some embodiments, the first peak distance S1 is about 17% of the first peak length L1. In some embodiments, the first peak distance S1 is from 13% to 22% of the first peak length L1. In some embodiments, the second peak distance S2 is from 18% to 24% of the second peak length L2. In some embodiments, the second peak distance S2 is about 21% of the second peak length L2. In some embodiments, the second peak distance S2 is from 16% to 26% of the second peak length L2. Similarly, in some embodiments, the third peak distance S3 is from 18% to 24% of the third peak length L3.

In some embodiments, the third peak distance S3 is about 21% of the third peak length L3. In some embodiments, the third peak distance S3 is from 16% to 26% of the third peak length L3.

Further, it should be noted that a value of the first peak length L1 decreases with a value of the first peak distance S1 and vice versa. In other words, the value of the first peak length L1 decreases as the first peak edge 118 moves closer to the leading portion 112, and the value of the first peak length L1 increases as the first peak edge 118 moves closer to the first central line 104. Similarly, a value of the second peak length L2 decreases with a value of the second peak distance S2 and vice versa. In other words, the value of the second peak length L2 decreases as the second peak edge 128 moves closer to the leading portion 112, and the value of the second peak length L2 increases as the second peak edge 128 moves closer to the second central line 108. Similarly, a value of the third peak length L3 decreases with a value of the third peak distance S3 and vice versa. In other words, the value of the third peak length L3 decreases as the third peak edge 134 moves closer to the trailing portion 114, and the value of the third peak length L3 increases as the third peak edge 134 moves closer to the second central line 108.

In some embodiments, the third lobe 132 includes a third convex surface 136 extending from the corresponding trailing portion 114 towards the second central line 108 along the transverse axis TA, such that the third convex surface 136 includes the third peak edge 134.

The shapes and positions of the first lobe 116, the second lobe 126, and the third lobe 132, as described above, may vary based on application requirements. In some alternative examples, the first lobe 116 may have a curved portion (not shown) instead of the planar surface 120. Further, in some examples, the first lobe 116 may be convex instead of including the concave surface 122. Moreover, in some examples, each of the second lobe 126 and the third lobe 132 may be partially concave instead of being substantially convex.

In some embodiments, the second major surface 106 further includes a central concave surface portion 138 extending between the second lobe 126 and the third lobe 132. The central concave surface portion 138 includes the second central line 108. In the illustrated embodiment of FIGS. 3A to 6B, the central concave surface portion 138 is adjacent to the perimeter surface 110.

Torque and flow discharge values associated with the butterfly valve 50 were determined using a test. For this determination, the butterfly valve 50 was placed in a test rig (not shown). The test rig included an upstream section having the butterfly valve 50 and a downstream section having a vacuum tank. The test rig also included a plurality of actively controlled valves between the vacuum tank and the butterfly valve 50. The plurality of actively controlled valves provided a constant set pressure differential between the upstream section and the downstream section. The test rig was operated by drawing atmospheric air through the upstream section and then through the plurality of actively controlled valves into the vacuum tank. The plurality of actively controlled valves were adjusted based on flow conditions and predetermined test profile to maintain the set pressure differential. Similar testing method was used to determine torque and flow discharge values associated with a comparative valve.

The butterfly valve 50 has a torque coefficient $C_{T1}$ that is equal to a ratio of a torque T applied on the butterfly valve 50 to rotate the butterfly valve 50 to a product of the cube of the diameter D of the valve body 100 and a pressure drop Δp across the butterfly valve 50 within the conduit 32. In other words, the torque coefficient $C_{T1}$ of the butterfly valve 50 is calculated according to Equation 1 provided below:

$$C_{T1} = (T)/(D^3 * \Delta p) \quad \text{(Equation 1)}$$

where, $C_{T1}$ is the torque coefficient of the butterfly valve 50;

T is torque applied of the butterfly valve 50 to rotate the butterfly valve 50;

D is the diameter of the valve body 100; and

Δp is the pressure drop across the butterfly valve 50 within the conduit 32.

Figure 7A:
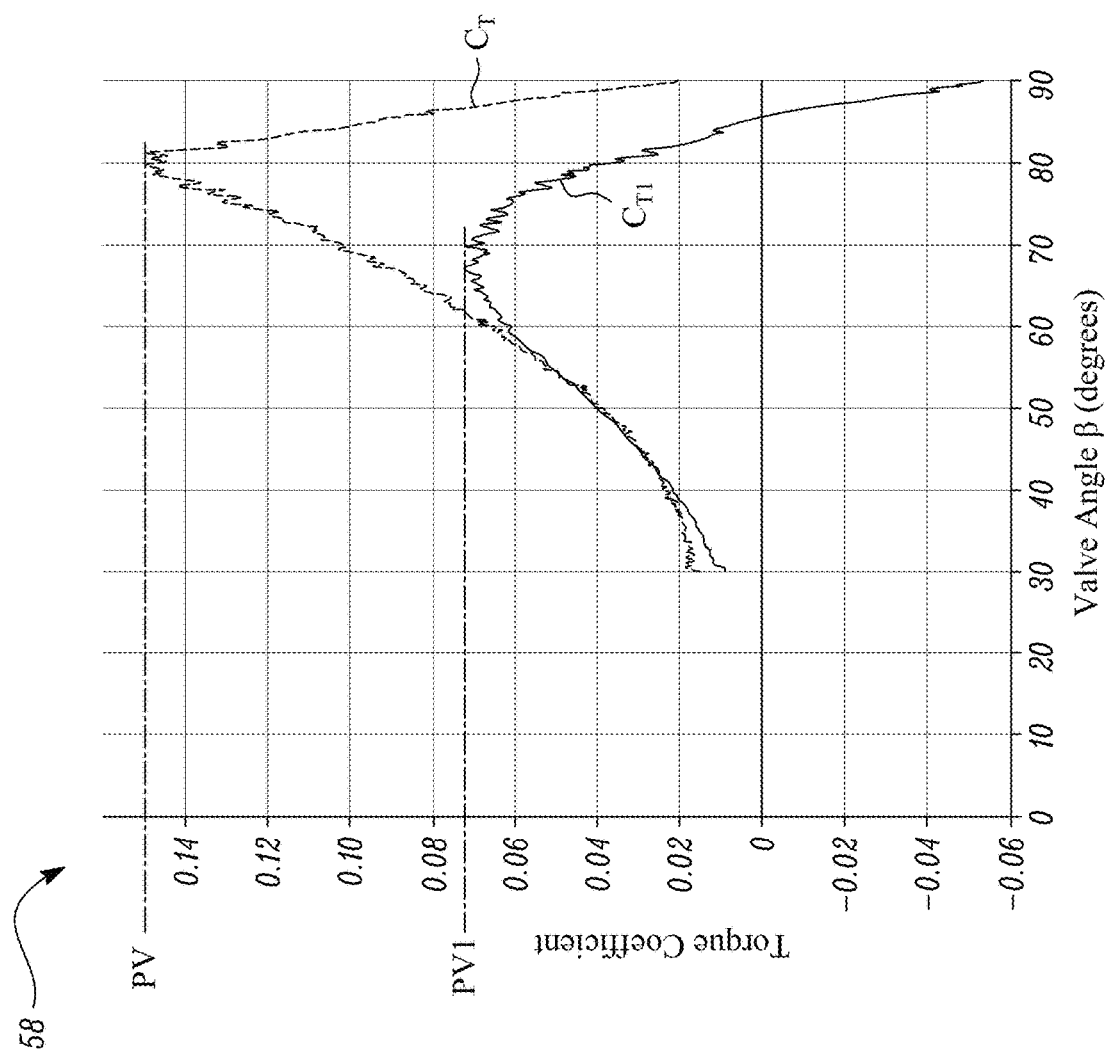
FIG. 7A is a graph illustrating torque coefficient versus valve angle for the butterfly valve and a comparative butterfly valve.

FIG. 7A is a graph 58 illustrating torque coefficient versus valve angle β for each of the butterfly valve 50 and the comparative butterfly valve (not shown), according to an embodiment of the present disclosure. The valve angle β is shown in the abscissa in degrees and the torque coefficient is shown in the ordinate. The valve angle β is equal to an angle of rotation of the valve body 100 about the longitudinal axis LA relative to the closed position P1, such that the valve angle β is equal to 0 degree at the closed position P1. The valve angle β is equal to 90 degrees at the fully open position P2. The butterfly valve 50 and the comparative butterfly valve have the same construction and diameter (i.e., the diameter D) except that first and second major surfaces of the comparative butterfly valve are planar without any lobes. Therefore, the graph 58 illustrates the torque coefficient $C_{T1}$ versus valve angle β for the butterfly valve 50, and a torque coefficient $C_T$ versus valve angle β for the comparative butterfly valve.

For similar flow conditions within the conduit 32, the torque coefficient $C_{T1}$ of the butterfly valve 50 varies with the valve angle β and has a peak value PV1, and the torque coefficient $C_T$ of the comparative butterfly valve varies with the valve angle β and has a peak value PV. In other words, for similar flow conditions within the conduit 32, the torque coefficient of each of the butterfly valve 50 and the comparative butterfly valve varies with the valve angle β and has a corresponding peak value (i.e., PV1 and PV). The peak value PV1 of the torque coefficient $C_{T1}$ of the butterfly valve 50 is less than the peak value PV of the torque coefficient $C_T$ of the comparative butterfly valve by at least 30%. In the illustrated embodiment of FIG. 7A, the peak value PV1 of the torque coefficient $C_{T1}$ of the butterfly valve 50 is less than the peak value PV of the torque coefficient $C_T$ of the comparative butterfly valve by at least 50%.

Referring to FIGS. 1 to 7A, the first lobe 116, the second lobe 126, and the third lobe 132 together reduce the peak value PV1 of the torque coefficient $C_{T1}$ of the butterfly valve 50 by at least 50% relative to the peak value PV of the torque coefficient $C_T$ of the comparative butterfly valve. The inclusion of the first lobe 116, the second lobe 126, and the third lobe 132 may cause reduced torque loading on the butterfly valve 50 as compared to that of conventional butterfly valves or the comparative butterfly valve. Thus, the butterfly valve 50 of the present disclosure is aerodynamically optimized for a desirable torque reduction relative to that of the comparative butterfly valve. This may improve an overall performance of the butterfly valve 50 and the gas turbine engine 10 in which the butterfly valve 50 is being installed.

The butterfly valve 50 has a flow coefficient $C_{F1}$ that is equal to a ratio of a mass flow rate "m" of the fluid flowing through the conduit 32 to a product of an area A of the butterfly valve 50 in the central plane CP and a square root of twice a product of a density p of the fluid and the pressure drop Δp across the butterfly valve 50. In other words, the flow coefficient $C_{F1}$ of the butterfly valve 50 is calculated according to Equation 2 provided below:

$$C_{F1} = (m)/\left(A * (2 * \rho * \Delta p)^{1/2}\right) \quad \text{(Equation 2)}$$

where, $C_{F1}$ is the flow coefficient of the butterfly valve 50;

"m" is the mass flow rate of the fluid flowing through the conduit 32;

A is area of the butterfly valve 50 in the central plane CP;

ρ is the density of the fluid; and

Δp is the pressure drop across the butterfly valve 50 within the conduit 32.

Figure 7B:
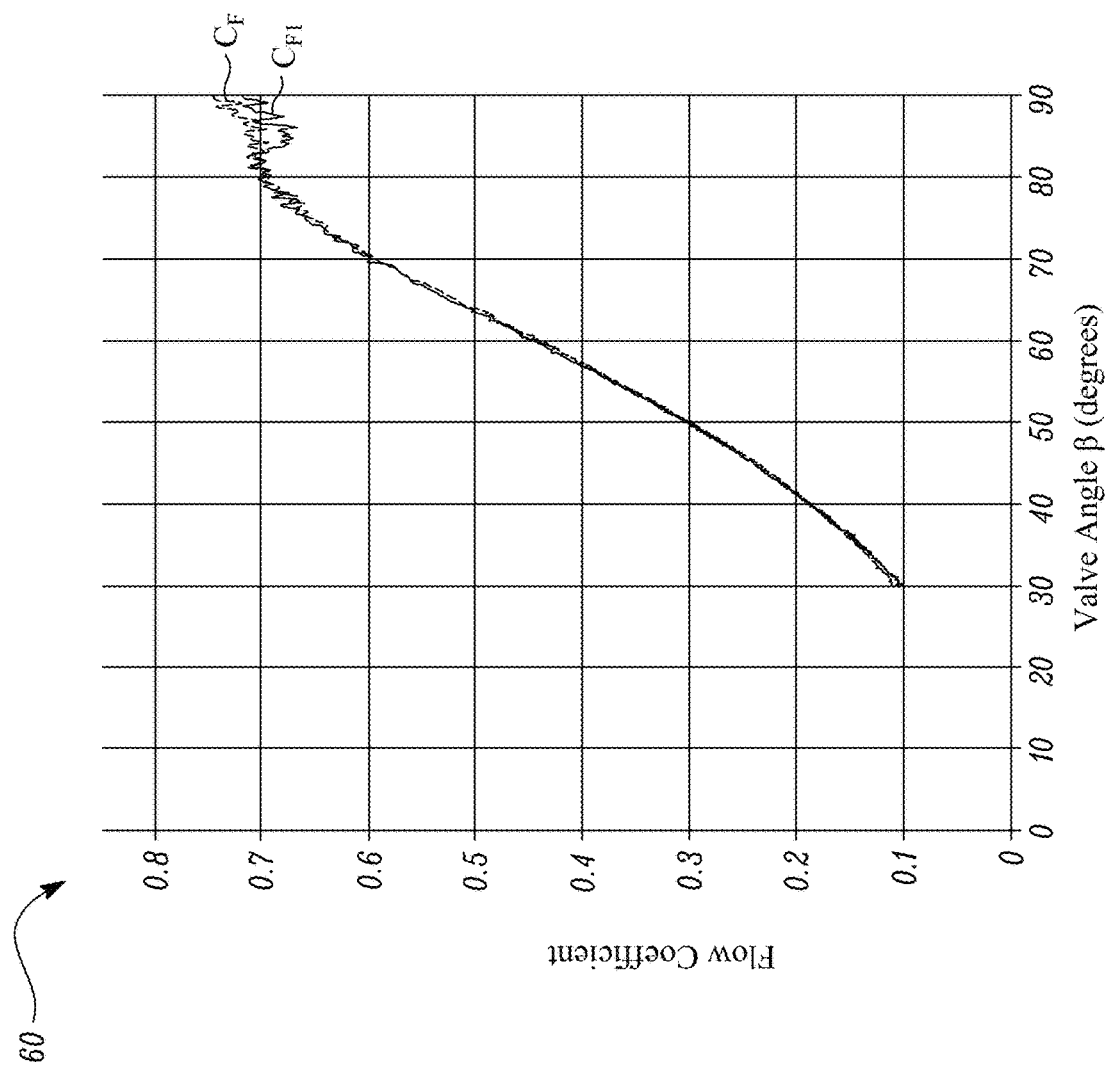
FIG. 7B is a graph illustrating flow coefficient versus valve angle for the butterfly valve and the comparative butterfly valve.

FIG. 7B is a graph 60 illustrating flow coefficient versus valve angle β for each of the butterfly valve 50 and a comparative butterfly valve, according to an embodiment of the present disclosure. The valve angle β is shown in the abscissa in degrees and the torque coefficient is shown in the ordinate. The graph 60 illustrates the flow coefficient $C_{F1}$ versus valve angle β for the butterfly valve 50, and a flow coefficient $C_F$ versus valve angle β for the comparative butterfly valve. The flow coefficient of each of the butterfly valve 50 and the comparative butterfly valve varies with the valve angle β. For similar flow conditions within the conduit 32 and for any value of the valve angle β, a maximum difference between the flow coefficient $C_{F1}$ of the butterfly valve 50 and the flow coefficient $C_F$ of the comparative butterfly valve is at most 10%. In some cases, the maximum difference between the flow coefficient $C_{F1}$ of the butterfly valve 50 and the flow coefficient $C_F$ of the comparative butterfly valve is at most 8%. As the maximum difference between the flow coefficient $C_{F1}$ of the butterfly valve 50 and the flow coefficient $C_F$ of the comparative butterfly valve is at most 10%, it is evident that there is minimal flow capacity reduction across an operating range of the butterfly valve 50.

Specifically, the flow coefficient $C_{F1}$ of the butterfly valve 50 is less than the flow coefficient $C_F$ of the comparative butterfly valve by at most 10%. As the maximum difference between the flow coefficient $C_{F1}$ of the butterfly valve 50 and the flow coefficient $C_F$ of the comparative butterfly valve is at most 10%, it is evident that there is minimal flow capacity reduction across the operating range of the butterfly valve 50. Hence, considering the comparison of the peak value PV1 of the torque coefficient $C_{T1}$ of the butterfly valve 50 with the peak value PV of the torque coefficient $C_T$ of the comparative butterfly valve, and the comparison of the flow coefficient $C_{F1}$ of the butterfly valve 50 with the flow coefficient $C_F$ of the comparative butterfly valve, it can be stated that the butterfly valve 50 may provide a desirable torque loading as well as an achievable flow capacity across the operating range of the butterfly valve 50.

Referring to FIGS. 1 to 7B, the first lobe 116, the second lobe 126, and the third lobe 132 may provide the butterfly valve 50 with the desirable optimized geometry that results in the reduced torque loading along with minimal flow capacity reduction across the operating range of the butterfly valve 50. This may provide an improved performance of the butterfly valve 50 as well as the low pressure compressor 14 or high pressure compressor 15 when installed for bleeding purposes in the gas turbine engine 10. Further, the inclusion of the first lobe 116, the second lobe 126, and the third lobe 132 does not restrict any movement of the butterfly valve 50, thereby making it possible to be easily controlled by a valve actuator (not shown).

While the reduced torque loading is achieved with appropriate consideration for flow discharge requirements across the operating range of the butterfly valve 50, a size of the valve actuator may also be relatively reduced.

Figure 8:
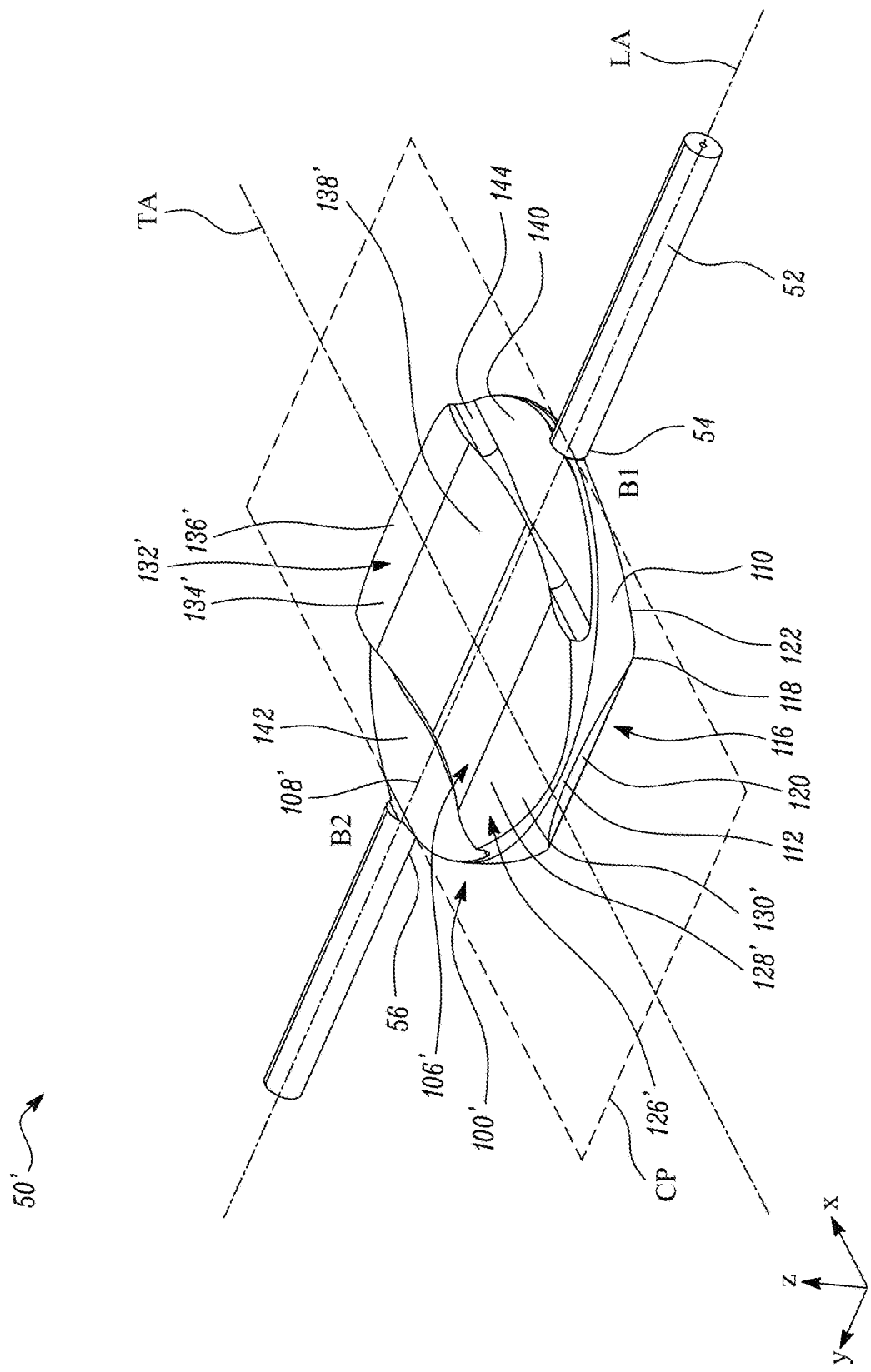
FIG. 8 is a perspective top view of a butterfly valve, according to another embodiment of the present disclosure.
Figure 9:
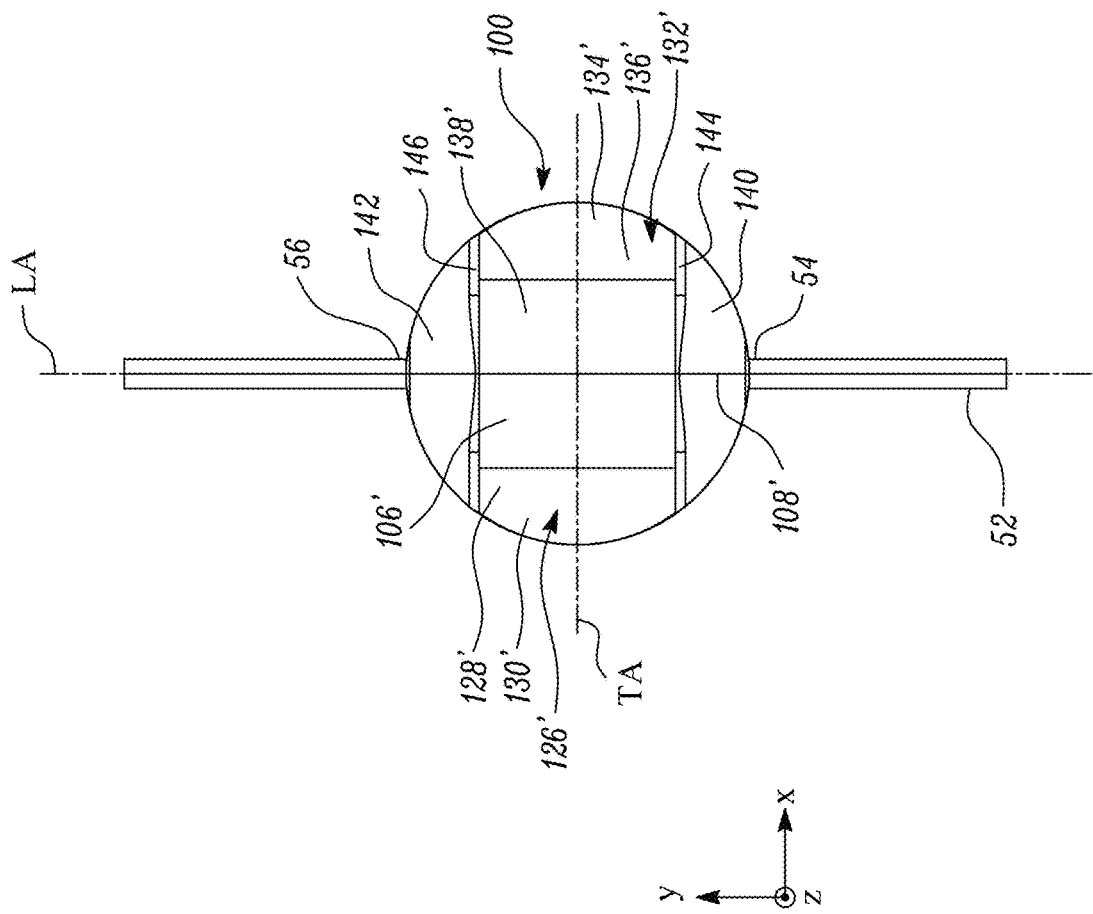
FIG. 9 is a top view of the butterfly valve of FIG. 8.
Figure 11A:
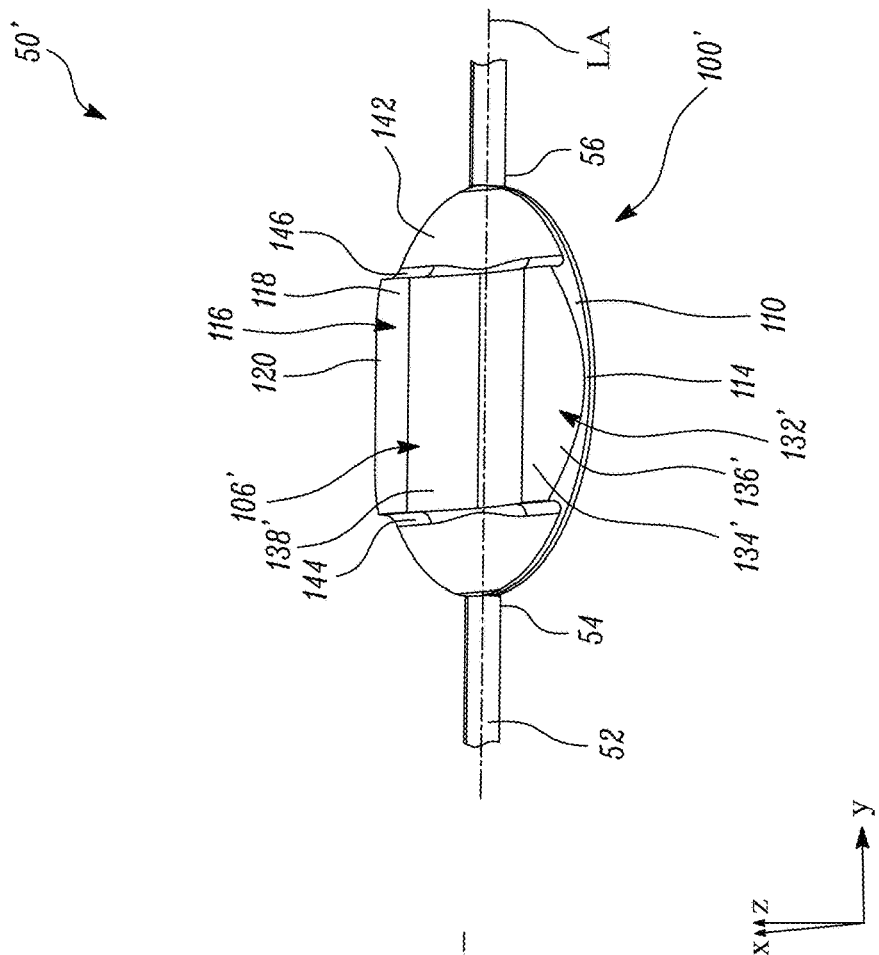
FIG. 11A is a perspective front view of the butterfly valve of FIG. 8.
Figure 11B:
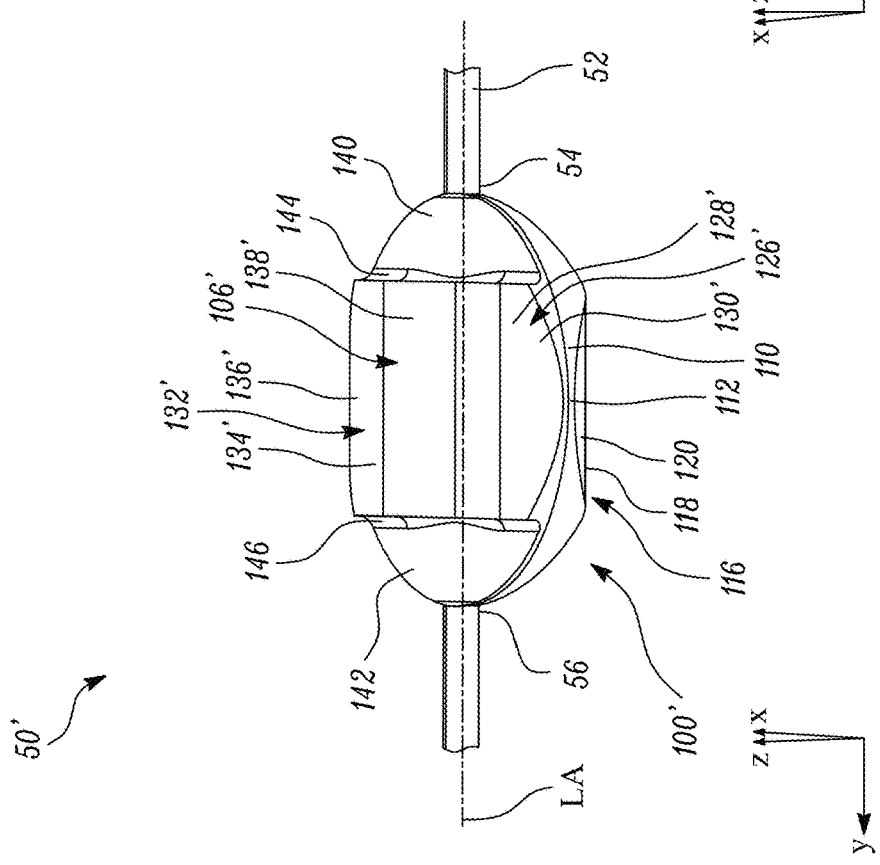
FIG. 11B is a perspective rear view of the butterfly valve of FIG. 8.

FIG. 8 is a perspective top view of a butterfly valve 50', according to another embodiment of the present disclosure. FIG. 9 is a top view of the butterfly valve 50' of FIG. 8, according to an embodiment of the present disclosure. FIG. 10A is a side view of the butterfly valve 50', as viewed from a first side B1 (shown in FIG. 8), according to an embodiment of the present disclosure. FIG. 10B is a side view of the butterfly valve 50', as viewed from a second side B2 (shown in FIG. 8) opposite to the first side B1, according to an embodiment of the present disclosure. FIG. 11A is a perspective front view of the butterfly valve 50', according to an embodiment of the present disclosure. FIG. 11B is a perspective rear view of the butterfly valve 50', according to an embodiment of the present disclosure.

Referring to FIGS. 8 to 11B, the butterfly valve 50' is substantially similar to the butterfly valve 50 shown in FIGS. 3A to 6B, with common components being referred to by the same numerals. Moreover, a functional advantage of the butterfly valve 50' is substantially the same as that of the butterfly valve 50. The butterfly valve 50' includes a valve body 100' which is substantially similar to the valve body 100 shown in FIGS. 3A to 6B. However, the valve body 100' includes a second major surface 106' (instead of the second major surface 106 shown in FIG. 3A). The second major surface 106' is equivalent to the second major surface 106 shown in FIG. 3A. The second major surface 106' includes a second central line 108' (instead of the second central line 108) extending along the length of the shaft 52 parallel to the longitudinal axis LA.

The valve body 100' further includes a second lobe 126' (instead of the second lobe 126 shown in FIG. 3A). The second lobe 126' is substantially similar to the second lobe 126 shown in FIG. 3A. The second lobe 126' partially forms the second major surface 106' and extends at least partially from the leading portion 112 towards the second central line 108' along the transverse axis TA. The second lobe 126' further extends at least partially along the longitudinal axis LA. The second lobe 126' includes a second peak edge 128' (instead of the second peak edge 128 shown in FIG. 3A) that is disposed proximal to the leading portion 112. The second lobe 126' ascends from the leading portion 112 to the second peak edge 128' at least along the second direction D2 (shown in FIGS. 10A and 10B) and descends from the second peak edge 128' towards the second central line 108'. The first lobe 116 and the second lobe 126' are disposed on opposing sides of the central plane CP.

The second lobe 126' further includes a second convex surface 130' (instead of the second convex surface 130 shown in FIG. 3A) extending from the corresponding leading portion 112 towards the second central line 108' along the transverse axis TA, such that the second convex surface 130' includes the second peak edge 128'.

The valve body 100 further includes a third lobe 132' (instead of the third lobe 132 shown in FIG. 3A). The third lobe 132' is substantially similar to the third lobe 132 shown in FIG. 3A. The third lobe 132' is spaced apart from each of the first lobe 116 and the second lobe 126'. The third lobe 132' partially forms the second major surface 106' of the valve body 100'. The third lobe 132' extends from the trailing portion 114 towards the second central line 108' along the transverse axis TA. The third lobe 132' further extends at least partially along the longitudinal axis LA. The second lobe 126' and the third lobe 132' are disposed on the same side of the central plane CP. Further, in the illustrated embodiment of FIGS. 8 to 11B, each of the second lobe 126' and the third lobe 132' is at least partially spaced apart from the perimeter surface 110 with respect to the longitudinal axis LA. Therefore, as shown in FIGS. 8 to 11B, in the butterfly valve 50', each of the second lobe 126' and the third lobe 132' is not fully continuous with the perimeter surface 110.

The third lobe 132' includes a third peak edge 134' (instead of the third peak edge 134 shown in FIG. 3A) that is disposed proximal to the trailing portion 114. The third lobe 132' ascends from the trailing portion 114 to the third peak edge 134' at least along the second direction D2 and descends from the third peak edge 134' towards the second central line 108'. Each of the first peak edge 118, the second peak edge 128', and the third peak edge 134' is rounded. In some embodiments, each of the first peak edge 118, the second peak edge 128', and the third peak edge 134' extends parallel to the longitudinal axis LA.

In some embodiments, the third lobe 132' includes a third convex surface 136' (instead of the third convex surface 136 shown in FIG. 3A) extending from the corresponding trailing portion 114 towards the second central line 108' along the transverse axis TA, such that the third convex surface 136' includes the third peak edge 134'.

In some embodiments, the second major surface 106' further includes a central concave surface portion 138' (instead of the central concave surface portion 138 shown in FIG. 3A) extending between the second lobe 126' and the third lobe 132'. The central concave surface portion 138' includes the second central line 108'. In the illustrated embodiment of FIGS. 8 to 11B, the central concave surface portion 138' is not adjacent to the perimeter surface 110.

The second major surface 106' further includes a first planar surface portion 140 extending from the perimeter surface 110 at least along the longitudinal axis LA. The second major surface 106' further includes a second planar surface portion 142 disposed opposite to the first planar surface portion 140. The second planar surface portion 142 extends from the perimeter surface 110 at least along the longitudinal axis LA.

The second major surface 106' further includes a first intermediate surface portion 144 rising from the first planar surface portion 140 at least along the second direction D2 to each of the second lobe 126', the third lobe 132', and the central concave surface portion 138'. The first intermediate surface portion 144 further extends at least partially along the transverse axis TA. The second major surface 106' further includes a second intermediate surface portion 146 disposed opposite to the first intermediate surface portion 144. The second intermediate surface portion 146 rises from the second planar surface portion 142 at least along the second direction D2 to each of the second lobe 126', the third lobe 132', and the central concave surface portion 138'. The second intermediate surface portion 146 further extends at least partially along the transverse axis TA.

Each of the second lobe 126', the third lobe 132', and the central concave surface portion 138' is at least partially separated from the perimeter surface 110 by the first planar surface portion 140 and the second planar surface portion 142. In some embodiments, each of the first intermediate surface portion 144 and the second intermediate surface portion 146 is at least partially concave. In some other embodiments, each of the first intermediate surface portion 144 and the second intermediate surface portion 146 may be partially convex or planar. Further, in some other embodiments, each of the second lobe 126', the third lobe 132', and the central concave surface portion 138' is at least partially separated from the perimeter surface 110 by a pair of opposing curved surfaces.

Figure 12A:
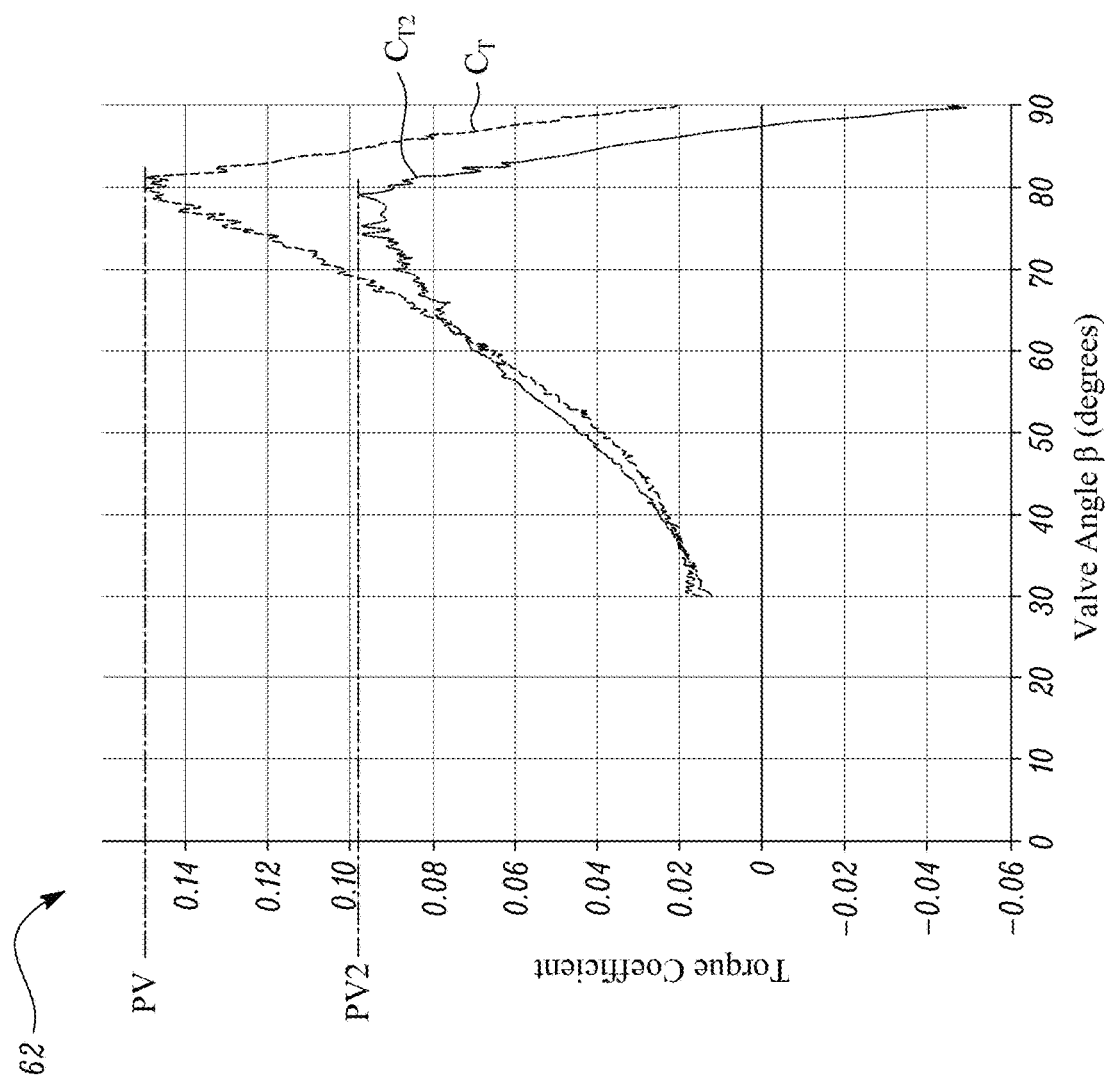
FIG. 12A is a graph illustrating torque coefficient versus valve angle for the butterfly valve of FIG. 8 and the comparative butterfly valve.

FIG. 12A is a graph 62 illustrating torque coefficient versus valve angle β for each of the butterfly valve 50' and the comparative butterfly valve, according to an embodiment of the present disclosure. The valve angle β is shown in the abscissa in degrees and the torque coefficient is shown in the ordinate. The butterfly valve 50' and the comparative butterfly have the same construction and diameter except that first and second major surfaces of the comparative butterfly valve are planar without any lobes. Therefore, the graph 62 illustrates a torque coefficient $C_{T2}$ versus valve angle β for the butterfly valve 50', and the torque coefficient $C_T$ (also shown in FIG. 7A) versus valve angle β for the comparative butterfly valve.

For similar flow conditions within the conduit 32, the torque coefficient $C_{T2}$ of the butterfly valve 50' varies with the valve angle β and has a peak value PV2, and the torque coefficient $C_T$ of the comparative butterfly valve varies with the valve angle β and has the peak value PV. The peak value PV2 of the torque coefficient $C_{T2}$ of the butterfly valve 50' is less than the peak value PV of the torque coefficient $C_T$ of the comparative butterfly valve by at least 30%. In some embodiments, the peak value PV2 of the torque coefficient $C_{T2}$ of the butterfly valve 50' is less than the peak value PV of the torque coefficient $C_T$ of the comparative butterfly valve by at least 35%.

Referring to FIGS. 8 to 12A, it can be stated that the first lobe 116', the second lobe 126', and the third lobe 132' together reduce the peak value PV2 of the torque coefficient $C_{T2}$ of the butterfly valve 50' by at least 30% relative to the peak value PV of the torque coefficient $C_T$ of the comparative butterfly valve. The inclusion of the first lobe 116', the second lobe 126', and the third lobe 132' may cause reduced torque loading on the butterfly valve 50' as compared to that of conventional butterfly valves or the comparative butterfly valve. Thus, the butterfly valve 50' of the present disclosure is aerodynamically optimized for a desirable 5 torque reduction relative to that of the comparative butterfly valve. This may improve an overall performance of the butterfly valve 50' and the gas turbine engine 10 in which the butterfly valve 50' is being installed.

Figure 12B:
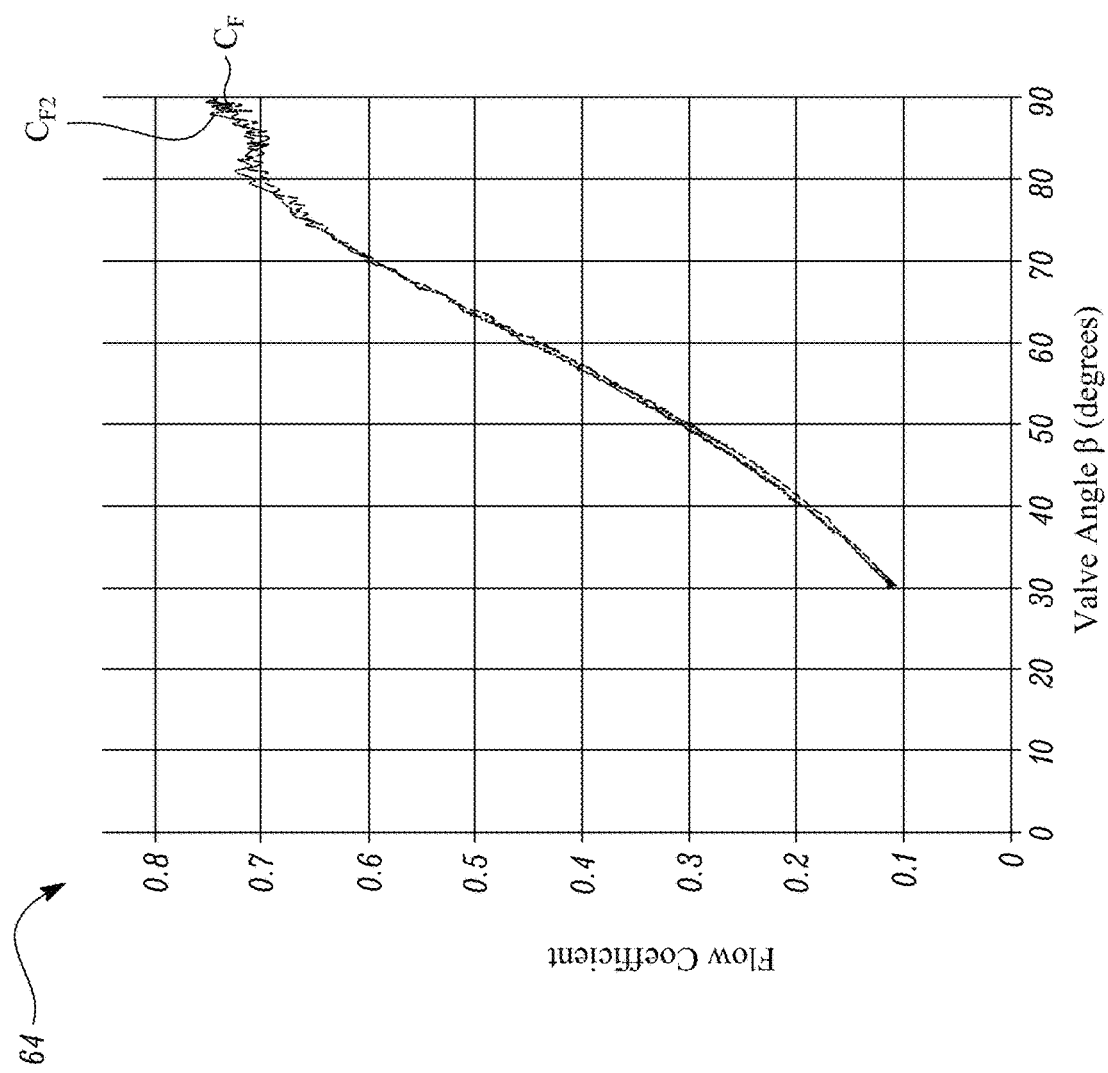
FIG. 12B is a graph illustrating flow coefficient versus valve angle for the butterfly valve of FIG. 8 and the comparative butterfly valve.

FIG. 12B is a graph 64 illustrating flow coefficient versus valve angle β for each of the butterfly valve 50' and the comparative butterfly valve, according to an embodiment of the present disclosure. The valve angle β is shown in the abscissa in degrees and the torque coefficient is shown in the ordinate. The graph 64 illustrates the flow coefficient $C_{F2}$ versus valve angle β for the butterfly valve 50', and the flow coefficient $C_F$ (also shown in FIG. 7B) versus valve angle β for the comparative butterfly valve. For similar flow conditions within the conduit 32 and for any value of the valve angle β, a maximum difference between the flow coefficient $C_{F2}$ of the butterfly valve 50' and the flow coefficient $C_F$ of the comparative butterfly valve is at most 10%. In the illustrated embodiment of FIG. 12B, the maximum difference between the flow coefficient $C_{F1}$ of the butterfly valve 50' and the flow coefficient $C_F$ of the comparative butterfly valve is at most 5%. As the maximum difference between the flow coefficient $C_{F2}$ of the butterfly valve 50' and the flow coefficient $C_F$ of the comparative butterfly valve is at most 5% to 10%, it is evident that there is minimal flow capacity reduction across the operating range of the butterfly valve 50'.

Referring to FIGS. 8A to 12B, the first lobe 116, the second lobe 126', the third lobe 132', the first planar surface portion 140, and the second planar surface portion 142 may provide the butterfly valve 50' with the desirable optimized geometry that results in the reduced torque loading along with negligible flow capacity reduction across the operating range of the butterfly valve 50'. This may provide an improved performance of the butterfly valve 50' as well as the low pressure compressor 14 or the high pressure compressor 15 when installed for bleeding purposes in the gas turbine engine 10.

Figure 13:
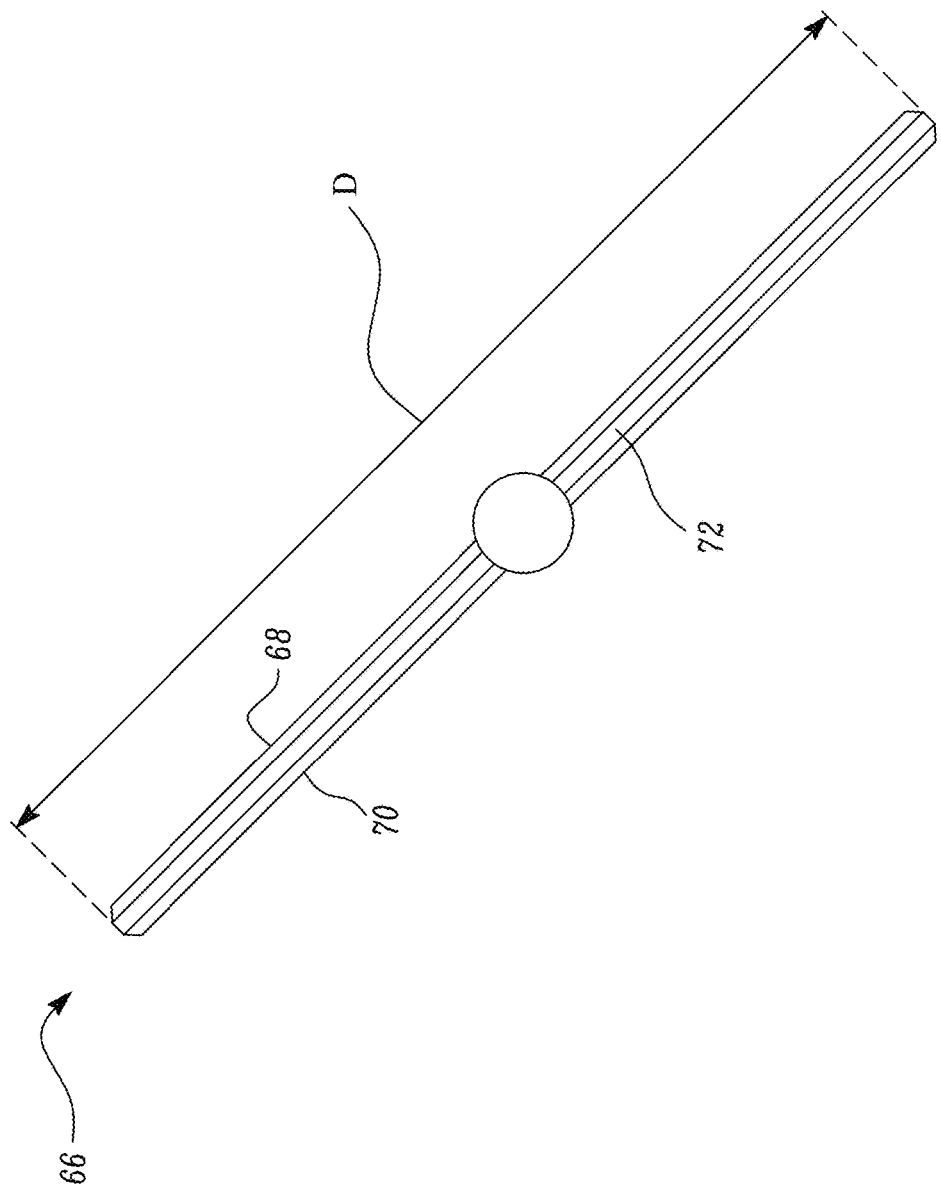
FIG. 13 is a front view of a base disc model, according to an embodiment of the present disclosure.

FIG. 13 is a front view of a base disc model 66 having a diameter D equal to the valve body 100 of the butterfly valve 50 (shown in FIGS. 2A to 6B). The base disc model 66 is used for manufacturing the butterfly valve 50 of FIGS. 2A to 6B. The base disc model 66 includes a first base major surface 68, a second base major surface 70 opposite to the first base major surface 68, and a base perimeter surface 72 extending between the first base major surface 68 and the second base major surface 70. Each of the first base major surface 68 and the second base major surface 70 is planar (without any lobes).

Figure 14:
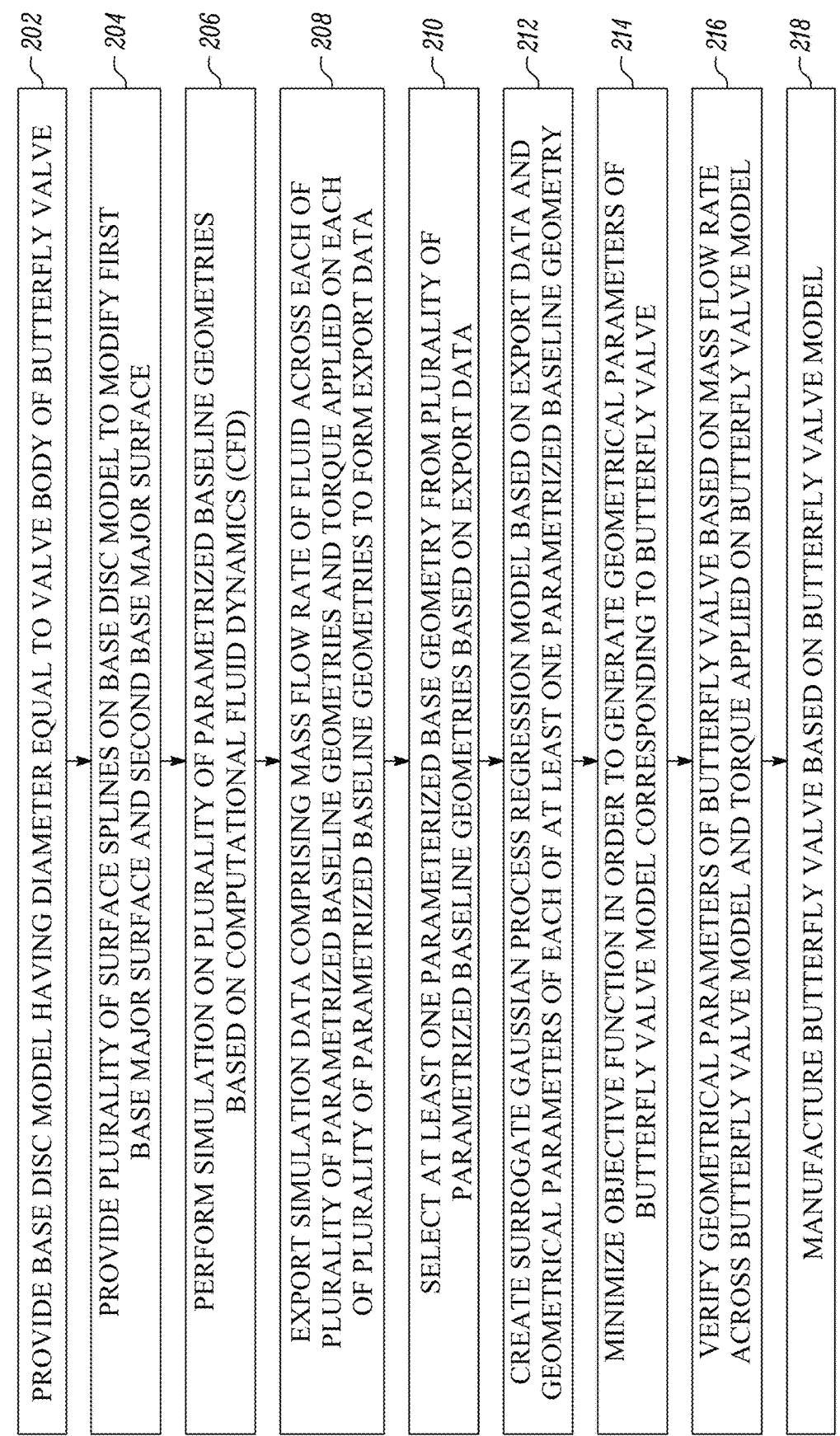
FIG. 14 is a flowchart illustrating a method for manufacturing the butterfly valve of FIG. 3A or FIG. 8, according to an embodiment of the present disclosure.

FIG. 14 is a flowchart illustrating a method 200 for manufacturing the butterfly valve 50 of FIG. 2A, according to an embodiment of the present disclosure. The method 200 may also be used for manufacturing the butterfly valve 50'.

Referring to FIGS. 3A, 13, and 14, at step 202, the method 200 includes providing the base disc model 66. The base disc model 66 has a torque coefficient $C_{TB}$ and a flow coefficient $C_{FB}$. The torque coefficient $C_{TB}$ of the base disc model 66 is calculated according to Equation 3 provided below:

$$C_{TB} = (T_B)/(D_B^3 * \Delta p_B) \quad \text{(Equation 3)}$$

where, $C_{TB}$ is the torque coefficient of the base disc model 66;
$T_B$ is torque applied of the base disc model 66 to rotate the base disc model 66;
$D_B$ is diameter of the base disc model 66; and
$\Delta p_B$ is pressure drop across the base disc model 66 within a conduit.

The flow coefficient $C_{FB}$ of the base disc model 66 is calculated according to Equation 4 provided below:

$$C_{FB} = (m_B)/(A_B * (2 * \rho * \Delta p_B)^{1/2}) \quad \text{(Equation 4)}$$

where, $C_{FB}$ is the flow coefficient of the base disc model 66;
"$m_B$" is mass flow rate of a fluid flowing through the conduit housing the base disc model 66;
$A_B$ is area of the base disc model 66 in a central plane;
$\rho$ is the density of the fluid flowing through the conduit; and
$\Delta p_B$ is pressure drop across the base disc model 66 within the conduit.

At step 204, the method 200 further includes providing a plurality of surface splines on the base disc model 66 to modify the first base major surface 68 and the second base major surface 70 in order obtain a plurality of parametrized baseline geometries corresponding to the plurality of surface splines. A surface spline can be understood as a mathematical representation for which it is easy to build an interface that will allow a user to design and control the shape of complex curves and surfaces. At step 206, the method 200 further includes performing, by a simulator software, simulation on the plurality of parametrized baseline geometries based on computational fluid dynamics (CFD) in order to obtain pressure and velocity distributions across various points on each of the plurality of parametrized baseline geometries. The simulator software may output mid-height plane velocity and pressure distributions on each of the plurality of parametrized baseline geometries. The simulator software may reduce computational time for multiple training data simulations.

At step 208, the method 200 further includes exporting, by a solver, simulation data including a mass flow rate of the fluid across each of the plurality of parametrized baseline geometries and a torque applied on each of the plurality of parametrized baseline geometries to form export data. At step 210, the method 200 further includes selecting at least one parameterized base geometry from the plurality of parametrized baseline geometries based on the export data. At step 212, the method 200 further includes creating, by the solver, a surrogate Gaussian process regression model based on the export data and geometrical parameters of each of the at least one parametrized baseline geometry. A surrogate model may refer to a mathematical model that seeks to predict, such as by interpolating or extrapolating a response, or output, based on output values previously acquired from empirical observation and/or mathematical calculations, including calculations using an existing full-physics model. Such surrogate model is generated by using Gaussian process regression model.

At step 214, the method 200 further includes minimizing, by the surrogate Gaussian process regression model, an objective function F2 in order to generate geometrical parameters of a butterfly valve model corresponding to the butterfly valve 50. The objective function F2 includes a torque parameter k2 to relate new torque coefficient $C_{TN}$ of the butterfly valve model to the torque coefficient $C_{TB}$ of the base disc model 66. The relationship between the new torque coefficient $C_{TN}$ of the butterfly valve model and the torque coefficient $C_{TB}$ of the base disc model 66 is shown in Equation 5.

$$C_{TN} = k2 * C_{TB} \quad \text{(Equation 5)}$$

The objective function F2 further includes a flow parameter k1 to relate new flow coefficient $C_{FN}$ of the butterfly valve model to the flow coefficient $C_{FB}$ of the base disc model 66. The relationship between the new flow coefficient $C_{FN}$ of the butterfly valve model and the coefficient $C_{FB}$ of the base disc model 66 is shown in Equation 6.

$$C_{FN} = k1 * C_{FB} \quad \text{(Equation 6)}$$

From Equation 6 and Equation 4, it can be derived that:

$$D_N = \left(D_B/(k1)^{1/2}\right) \quad \text{(Equation 7)}$$

where, $D_N$ is diameter of the butterfly valve model.

From Equation 5 and Equation 3, it can be derived that:

$$D_N = \left(D_B/(k2)^{1/3}\right) \quad \text{(Equation 8)}$$

Equation 7 and Equation 8 show dependence of adjustment in valve characteristics on the torque parameter k2 and the flow parameter k1. The objective function F2 is calculated based on Equation 7 and Equation 8.

$$F2 = (k2)^{1/3}/(k1)^{1/2} \quad \text{(Equation 9)}$$

To generate the geometrical parameters of the butterfly valve model corresponding to the butterfly valve 50 shown in FIG. 3A, it is required to minimize a value of the objective function F2 shown in Equation 9.

At step 216, the method 200 further includes verifying, by the simulator software, the geometrical parameters of the butterfly valve 50 based on the mass flow rate across the butterfly valve model and the torque applied on the butterfly valve model. This is to verify desirable pressure and velocity distributions across various points on the butterfly valve 50. At step 218, the method 200 further includes manufacturing the butterfly valve 50 based on the butterfly valve model. Any suitable manufacturing method may be used.

It will be understood that the present disclosure is not limited to the embodiments above-described and various modifications and improvements can be made without departing from the concepts described herein. For example, although the embodiments disclosed relate to a butterfly valve for a gas turbine engine, it will be appreciated that the embodiments may be applied to a range of different applications, in which it is desirable to reduce the actuation torque of a butterfly-type valve. Except where mutually exclusive, any of the features may be employed separately or in combination with any other features and the disclosure extends to and includes all combinations and sub-combinations of one or more features described herein.

We claim:

1. A butterfly valve for a conduit defining a passage for a flow of a fluid therethrough in a flow direction, the butterfly valve comprising:
    a shaft rotatably mounted to the conduit and defining a longitudinal axis along its length, such that the shaft is rotatable about the longitudinal axis; and
    a valve body coupled to the shaft, such that the valve body is rotatable along with the shaft about the longitudinal axis between a closed position and a fully open position, the valve body defining a transverse axis perpendicular to the longitudinal axis, wherein, in the closed position, the valve body engages the conduit to close the passage, wherein, in the fully open position, the valve body opens the passage to allow the flow of the fluid, the valve body comprising:
    a first major surface facing the flow of the fluid when the valve body is in the closed position, wherein the first major surface comprises a first central line extending along the length of the shaft parallel to the longitudinal axis;
    a second major surface opposite to the first major surface, wherein the second major surface comprises a second central line extending along the length of the shaft parallel to the longitudinal axis;

a perimeter surface that is arcuate and extends between the first major surface and the second major surface, wherein the perimeter surface is configured to engage with the conduit in the closed position of the valve body, the perimeter surface comprising a leading portion that is spaced apart from each of the first central line and the second central line, and a trailing portion that is diametrically opposite to the leading portion, wherein, in the fully open position, the leading portion is a most upstream edge of the perimeter surface with respect to the flow direction and the trailing portion is a most downstream edge of the perimeter surface with respect to the flow direction, the transverse axis of the valve body extending between the leading portion and the trailing portion;

a central plane disposed between the first major surface and the second major surface, wherein the central plane contains the longitudinal axis, a central point of the leading portion, and a central point of the trailing portion, the perimeter surface defining a diameter of the valve body in the central plane, the valve body further defining a first direction normal to the central plane and extending towards the first major surface and a second direction opposite to the first direction;

a first lobe partially forming the first major surface and extending at least partially from the leading portion towards the first central line along the transverse axis, the first lobe further extending at least partially along the longitudinal axis, wherein the first lobe comprises a first peak edge that is disposed proximal to the leading portion, such that the first lobe ascends from the leading portion to the first peak edge at least along the first direction and descends from the first peak edge towards the first central line;

a second lobe partially forming the second major surface and extending at least partially from the leading portion towards the second central line along the transverse axis, the second lobe further extending at least partially along the longitudinal axis, wherein the second lobe comprises a second peak edge that is disposed proximal to the leading portion, such that the second lobe ascends from the leading portion to the second peak edge at least along the second direction and descends from the second peak edge towards the second central line; and a third lobe spaced apart from each of the first lobe and the second lobe and partially forming the second major surface, the third lobe extending from the trailing portion towards the second central line along the transverse axis, the third lobe further extending at least partially along the longitudinal axis, wherein the third lobe comprises a third peak edge that is disposed proximal to the trailing portion, such that the third lobe ascends from the trailing portion to the third peak edge at least along the second direction and descends from the third peak edge towards the second central line;

wherein the first lobe and the second lobe are disposed on opposing sides of the central plane, wherein the second lobe and the third lobe are disposed on the same side of the central plane, and wherein each of the first peak edge, the second peak edge, and the third peak edge is rounded.

2. The butterfly valve of claim 1, wherein each of the first peak edge, the second peak edge, and the third peak edge extends parallel to the longitudinal axis.

3. The butterfly valve of claim 1, wherein the first lobe further comprises a planar surface ascending from the leading portion to the first peak edge and a concave surface descending from the first peak edge towards the first central line.

4. The butterfly valve of claim 3, wherein the planar surface is inclined to the central plane by an inclination angle of from 40 degrees to 50 degrees.

5. The butterfly valve of claim 1, wherein a first peak distance between the leading portion and the first peak edge is from 8% to 10% of the diameter of the valve body.

6. The butterfly valve of claim 1, wherein a second peak distance between the leading portion and the second peak edge is equal to a third peak distance between the trailing portion and the third peak edge, and wherein each of the second peak distance and the third peak distance is from 14% to 16% of the diameter of the valve body.

7. The butterfly valve of claim 1, wherein:
a first peak height between the first peak edge and the central plane is from 9% to 11% of the diameter of the valve body;
a second peak height between the second peak edge and the central plane is from 6% to 8% of the diameter of the valve body; and
a third peak height between the third peak edge and the central plane is from 5% to 7% of the diameter of the valve body.

8. The butterfly valve of claim 1, wherein a first peak length of the first peak edge parallel to the first central line is from 50% to 55% of the diameter of the valve body.

9. The butterfly valve of claim 1, wherein a second peak length of the second peak edge parallel to the second central line is equal to a third peak length of the third peak edge parallel to the second central line, and wherein each of the second peak length and the third peak length is from 40% to 70% of the diameter of the valve body.

10. The butterfly valve of claim 1, wherein the first peak edge is closer to the leading portion than the second peak edge with respect to the transverse axis.

11. The butterfly valve of claim 1, wherein:
the second lobe comprises a second convex surface extending from the corresponding leading portion towards the second central line along the transverse axis, such that the second convex surface includes the second peak edge; and
the third lobe comprises a third convex surface extending from the corresponding trailing portion towards the second central line along the transverse axis, such that the third convex surface includes the third peak edge.

12. The butterfly valve of claim 1, wherein the first major surface comprises a planar surface portion extending from the trailing portion to the first lobe and including the first central line, and wherein the planar surface portion is adjacent to the perimeter surface.

13. The butterfly valve of claim 1, wherein the second major surface comprises a central concave surface portion extending between the second lobe and the third lobe, the central concave surface portion including the second central line.

14. The butterfly valve of claim 13, wherein the second major surface further comprises:
a first planar surface portion extending from the perimeter surface at least along the longitudinal axis;
a second planar surface portion disposed opposite to the first planar surface portion and extending from the perimeter surface at least along the longitudinal axis;

a first intermediate surface portion rising from the first planar surface portion at least along the second direction to each of the second lobe, the third lobe, and the central concave surface portion, the first intermediate surface portion further extending at least partially along the transverse axis; and a second intermediate surface portion disposed opposite to the first intermediate surface portion and rising from the second planar surface portion at least along the second direction to each of the second lobe, the third lobe, and the central concave surface portion, the second intermediate surface portion further extending at least partially along the transverse axis;

wherein each of the second lobe, the third lobe, and the central concave surface portion is at least partially separated from the perimeter surface by the first planar surface portion and the second planar surface portion.

15. The butterfly valve of claim 14, wherein each of the first intermediate surface portion and the second intermediate surface portion is at least partially concave.

16. The butterfly valve of claim 15, wherein the central concave surface portion is adjacent to the perimeter surface.

17. The butterfly valve of claim 14, wherein each of the second lobe and the third lobe is at least partially spaced apart from the perimeter surface with respect to the longitudinal axis.

18. The butterfly valve of claim 1, wherein the shaft comprises a first shaft portion and a second shaft portion spaced apart from the first shaft portion with respect to the longitudinal axis, wherein the first shaft portion and the second shaft portion are coupled to the valve body on opposing sides, such that each of the first central line and the second central line extends between the first shaft portion and the second shaft portion.

19. The butterfly valve of claim 1, wherein the valve body is rotated by 90 degrees about the longitudinal axis relative to the closed position to open the passage, the valve body defining a valve angle that is equal to an angle of rotation of the valve body about the longitudinal axis relative to the closed position, such that the valve angle is equal to 0 degree at the closed position, wherein the butterfly valve has a torque coefficient that is equal to a ratio of a torque applied on the butterfly valve to rotate the butterfly valve to a product of the cube of the diameter of the valve body and a pressure drop across the butterfly valve within the conduit, wherein the butterfly valve and a comparative butterfly valve have the same construction and diameter except that first and second major surfaces of the comparative butterfly valve are planar without any lobes, wherein, for similar flow conditions within the conduit, the torque coefficient of each of the butterfly valve and the comparative butterfly valve varies with the valve angle and has a corresponding peak value, and wherein the peak value of the torque coefficient of the butterfly valve is less than the peak value of the torque coefficient of the comparative butterfly valve by at least 30%.

20. A gas turbine engine including:
a compressor;
a bleed conduit disposed in fluid communication with the compressor; and
a butterfly valve of claim 1, wherein the butterfly valve is disposed in the bleed conduit.

* * * * *